(12) United States Patent
Yamamoto

(10) Patent No.: US 11,695,354 B2
(45) Date of Patent: Jul. 4, 2023

(54) MOTOR CONTROL APPARATUS, OPTICAL APPARATUS, AND ROBOT MANIPULATOR APPARATUS

(71) Applicant: CANON KABUSHIKI KAISHA, Tokyo (JP)

(72) Inventor: Jun Yamamoto, Tokyo (JP)

(73) Assignee: Canon Kabashiki Kaisha, Tokyo (JP)

( * ) Notice: Subject to any disclaimer, the term of this patent is extended or adjusted under 35 U.S.C. 154(b) by 113 days.

(21) Appl. No.: 17/324,785

(22) Filed: May 19, 2021

(65) Prior Publication Data
US 2021/0367539 A1 Nov. 25, 2021

(30) Foreign Application Priority Data

May 25, 2020 (JP) .................................. 2020-090341
Dec. 14, 2020 (JP) .................................. 2020-206996

(51) Int. Cl.
*H02P 6/24* (2006.01)
*H02P 6/18* (2016.01)
*H02P 6/30* (2016.01)
*H02P 6/16* (2016.01)
*G03B 9/34* (2021.01)

(52) U.S. Cl.
CPC ............... *H02P 6/18* (2013.01); *H02P 6/16* (2013.01); *H02P 6/24* (2013.01); *H02P 6/30* (2016.02); *G03B 9/34* (2013.01)

(58) Field of Classification Search
CPC ...... H02P 6/18; H02P 6/30; H02P 6/16; H02P 6/24; H02P 8/18
See application file for complete search history.

(56) References Cited

U.S. PATENT DOCUMENTS

2017/0063264 A1* 3/2017 Suzuki ............... H02P 8/18
2017/0087719 A1* 3/2017 Tsuchiya ........... G05B 19/4065
2018/0351484 A1* 12/2018 Mizuo ................ H02P 6/24

FOREIGN PATENT DOCUMENTS

JP 2015-007723 A 1/2015

\* cited by examiner

*Primary Examiner* — Cortez M Cook
(74) *Attorney, Agent, or Firm* — Canon U.S.A., Inc. IP Division

(57) ABSTRACT

A motor control apparatus includes a detection unit configured to detect an actual rotation position of a motor, a control unit configured to provide position feedback control on the motor so that the detected actual rotation position sequentially approaches a plurality of target rotation positions, and a processing unit configured to perform, before the position feedback control starts, processing to make an initial position deviation fall within a predetermined range, the initial position deviation being a difference between the actual rotation position and a first target rotation position of the plurality of target rotation positions.

22 Claims, 12 Drawing Sheets

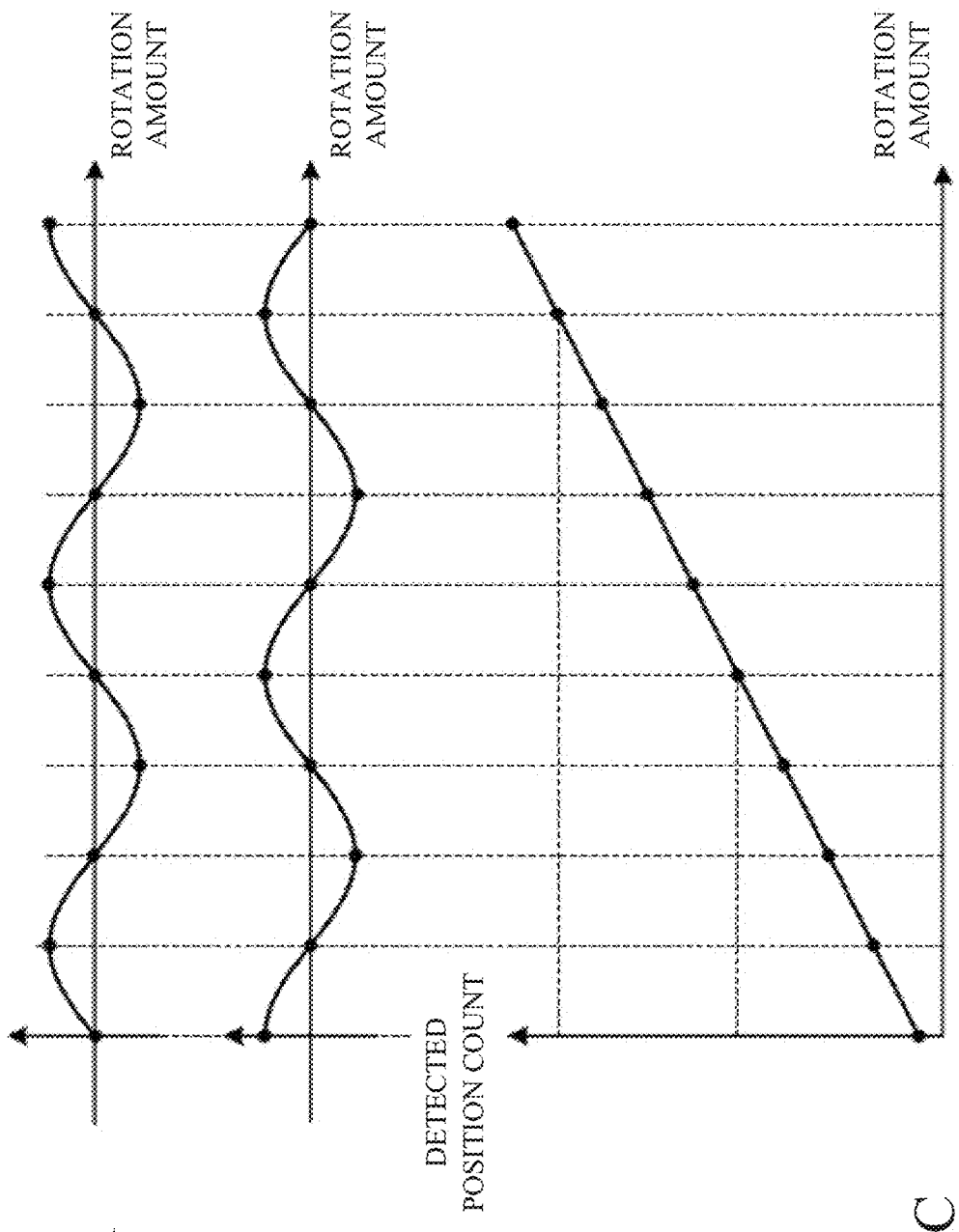

MOTOR CONTROL APPARATUS, OPTICAL APPARATUS, AND ROBOT MANIPULATOR APPARATUS

BACKGROUND

Field of the Disclosure

The present disclosure relates to a motor control apparatus that provides position feedback control on a motor.

Description of the Related Art

The actual rotation position of a motor can be controlled along a target trajectory, by detecting an actual rotation position of the motor and performing position feedback control for adjusting a driving voltage applied to the motor, based on a deviation between the actual rotation position and the target rotation position, that is, the target trajectory.

An optical apparatus such as a digital camera and an interchangeable lens includes an optical unit driven by a motor such as a shutter unit and a diaphragm unit. Japanese Patent Application Laid-Open No. 2015-7723 discloses a focal plane shutter unit that rotates a motor in a forward direction to make, via a driving lever, a shutter blade travel from an initial position to an exposure end position, and thereafter rotates the motor in a reverse direction to make the shutter blade return to the initial position. In this shutter unit, the shutter blade is driven between the initial position and the exposure end position with small number of rotations of the motor such as once.

However, when the position feedback control is performed on the motor with the small number of rotations of the motor, if an initial position deviation is large, where the initial position deviation is a difference between the actual rotation position at a start of the control and the target trajectory, oscillation occurs in a driving voltage of the motor to be controlled, making it difficult to make the actual rotation position of the motor coincide with the target trajectory. Particularly, in the focal plane shutter unit, if the actual rotation position of the motor, i.e., an actual traveling trajectory of a shutter blade, deviates from the target trajectory, i.e., a target traveling trajectory of the shutter blade, uneven exposure occurs. Further, the oscillation of the driving voltage of the motor causes a decrease in the accuracy of the stop rotation position of the motor.

These are not limited to optical units, but can be said to be the common issues also in applications where the position feedback control is performed on the motor at high speed and with small rotation number.

SUMMARY

Embodiments of the present disclosure provide a motor control apparatus which can provide good controllability by reducing an initial position deviation when providing position feedback control on a motor, and an optical apparatus and a robot manipulator apparatus having the same.

A motor control apparatus according to one or more embodiments of the present disclosure includes a detection unit configured to detect an actual rotation position of a motor, a control unit configured to provide position feedback control on the motor so that the detected actual rotation position sequentially approaches a plurality of target rotation positions, and a processing unit configured to perform, before the position feedback control starts, processing to make an initial position deviation fall within a predetermined range, the initial position deviation being a difference between the actual rotation position and a first target rotation position of the plurality of target rotation positions.

An optical apparatus and a robot manipulator apparatus including the above motor control apparatus, a motor control method corresponding to the above motor control apparatus, and a storage medium storing a computer program causing a computer to execute the motor control method also constitute other aspects of the present disclosure.

Further features of the disclosure will become apparent from the following description of exemplary embodiments with reference to the attached drawings.

BRIEF DESCRIPTION OF THE DRAWINGS

FIGS. 5A to 5C are diagrams each illustrating a relationship between a position detection sensor signal and a detected position count according to the first embodiment.

DESCRIPTION OF THE EMBODIMENTS

Referring now to the accompanying drawings, a description will be given of embodiments according to the present disclosure.

First Embodiment

In a first embodiment, a description will be given of a motor control apparatus and a focal plane shutter unit as an optical unit.

Figure 1:
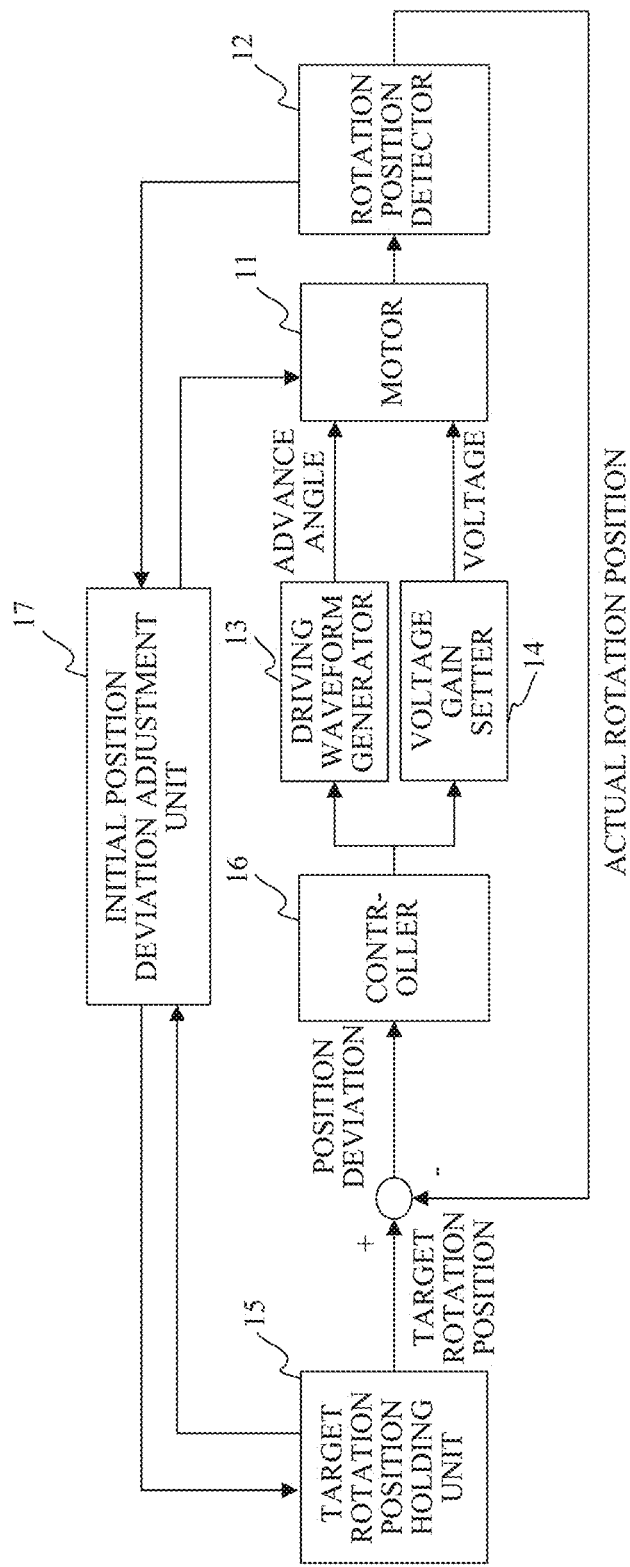
FIG. 1 is a block diagram illustrating a configuration of a motor control apparatus according to a first embodiment.

FIG. 1 illustrates a schematic configuration of a motor control apparatus, which is the first embodiment of the present disclosure. The motor control apparatus is configured to perform position feedback control on a motor 11 so that an actual rotation position of the motor 11 (hereinafter simply referred to as an "actual rotation position") sequentially approaches a predetermined plurality of target rotation positions.

As the motor 11, various types of motors can be used as long as the motor converts electricity into a rotation motion. More specifically, a brush DC motor, a brushless DC motor, a stepping motor or the like may be used. This embodiment uses a stepping motor which can determine a rotation position with high accuracy.

The motor control apparatus includes a rotation position detector (detection unit) 12, a driving waveform generator 13, a voltage gain setter 14, a target rotation position holding unit 15, a controller 16, and an initial position deviation adjustment unit (processing unit) 17. A control unit includes the driving waveform generator 13, the voltage gain setter 14, the target rotation position holding unit 15, and the controller 16.

The rotation position detector 12 is configured to detect a rotation position of the motor 11. The position detection sensor may be, for example, an optical encoder including an optical scale having a stripe pattern, and an optical sensor that receives light emitted from a light emitting portion and reflected or transmitted by the optical scale. The position detection sensor may also be a magnetic encoder or the like, the magnetic encoder including a magnetic scale having a magnetic pattern and a magnetoresistive element (MR sensor) for detecting a change in magnetism from the magnetic scale. A rotation angle of a motor shaft may be directly detected by using such a sensor, or a position of a driven member driven by the motor may be detected and converted into the rotation angle of the motor shaft.

The driving waveform generator 13 is configured to generate a waveform of a driving voltage applied to the motor 11, which will be referred to as a "driving waveform" hereinafter. The voltage gain setter 14 is configured to set a voltage gain value for the driving waveform.

The target rotation position holding unit 15 is configured to hold information on the above-described plurality of target rotation positions, which will be also collectively referred to as "target rotation position information" hereinafter. The controller 16 is configured to determine an output control amount by inputting a position deviation which is a difference between the actual rotation position of the motor 11 detected by the rotation position detector 12 and the target rotation position at the time of the detection, and to assign the output control amount to each of the driving waveform generator 13 and the voltage gain setter 14.

The initial position deviation adjustment unit 17 is configured to control the motor 11 so that a position deviation before control on the motor 11 starts, which will be referred to as an "initial position deviation" hereinafter, is within a predetermined range, i.e., within an allowable range. The controller 16 starts the position feedback control on the motor 11 after processing is performed by the initial position deviation adjustment unit 17.

The driving waveform generator 13 may include a synchronization unit configured to synchronize a phase of the actual rotation position detected by the rotation position detector 12, i.e., a mechanical angle, and a phase of the driving waveform generated by the driving waveform generator 13, i.e., an electric angle, and a phase difference setter configured to hold a predetermined phase difference between the actual rotation position and the driving waveform when the phase is synchronized by the synchronization unit. The phase difference corresponds to an advance angle, and if the phase of the driving waveform is advanced by 90 degrees with respect to the rotation position at a time of driving start of the motor 11, maximum torque can be generated in the motor 11.

Figure 2:
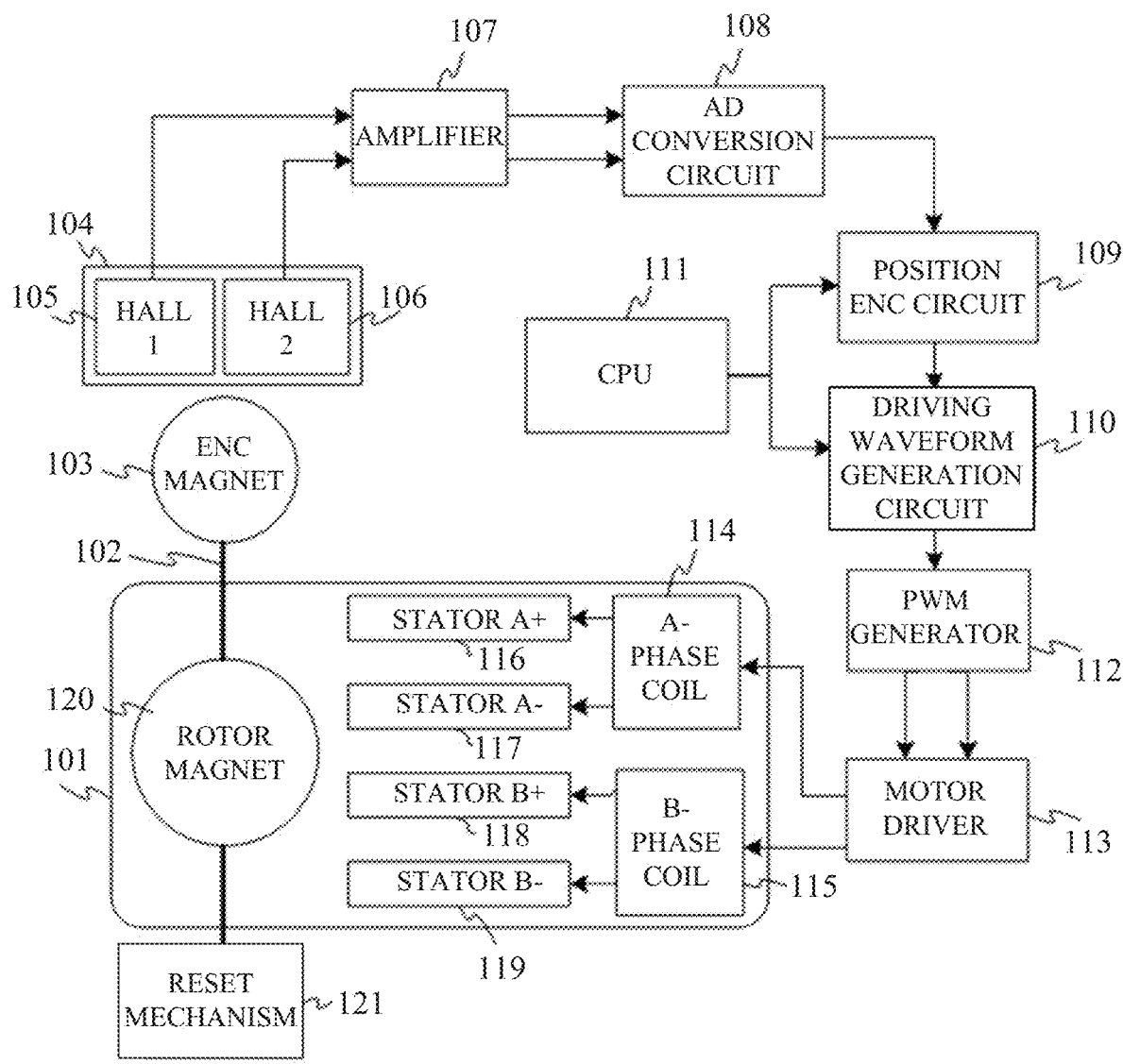
FIG. 2 is a block diagram illustrating a detailed configuration of the motor control apparatus according to the first embodiment.

FIG. 2 illustrates a specific configuration of the motor control apparatus when a stepping motor 101 is used as the motor 11 illustrated in FIG. 1. The rotation position detector 12 illustrated in FIG. 1 includes an ENC magnet 103, a Hall element unit 104, an amplifier 107, an AD conversion circuit 108, and a position ENC circuit 109, each of which is illustrated in FIG. 2. The driving waveform generator 13 illustrated in FIG. 1 corresponds to a driving waveform generation circuit 110 illustrated in FIG. 2, and the voltage gain setter 14 illustrated in FIG. 1 corresponds to a PWM generator 112. The target rotation position holding unit 15 and the controller 16 illustrated in FIG. 1 correspond to a CPU 111. A motor driver 113 is a driving circuit configured to receive a signal from the PWM generator 112 of the motor control apparatus and applies a driving voltage to the stepping motor 101.

The stepping motor 101 includes a rotor magnet 120, a rotor shaft 102 that rotates integrally with the rotor magnet 120, four stators (A+, A−, B+, and B−) 116, 117, 118, and 119, an A-phase coil 114, a B-phase coil 115, and a reset mechanism 121. The rotor shaft 102 includes an ENC magnet 103 and a reset mechanism 121. The ENC magnet 103 is magnetized so that a sinusoidal magnetic field is generated in accordance with a rotation position. The reset mechanism 121 is configured to output a signal that changes when the rotor shaft 102 is at one certain rotation position. The output signal provides a reference for an absolute value of the rotation position of the rotor shaft 102. The reset mechanism 121 includes, for example, a moving body that translationally travels in accordance with a rotation of a screw portion provided on the rotor shaft 102, and a photo interrupter (PI), and is configured to change the output signal from the PI when a slit of the moving body passes through the PI.

The Hall element unit 104 includes two Hall elements 105 and 106. The Hall elements 105 and 106 are configured to detect change in the magnetic field, which is caused by rotation of the ENC magnet 103, at respective positions and to output detection signals. The ENC magnet 103 and the Hall element unit 104 are included in a magnetic encoder. An optical encoder may be used instead of the magnetic encoder. In that case, the ENC magnet 103 is replaced with a scale having a pattern in which reflective and non-reflective parts or light-transmissive and non-light-transmissive parts are alternately arranged, and the Hall element unit 104 is replaced with an LED and a photodiode.

Figure 3C:
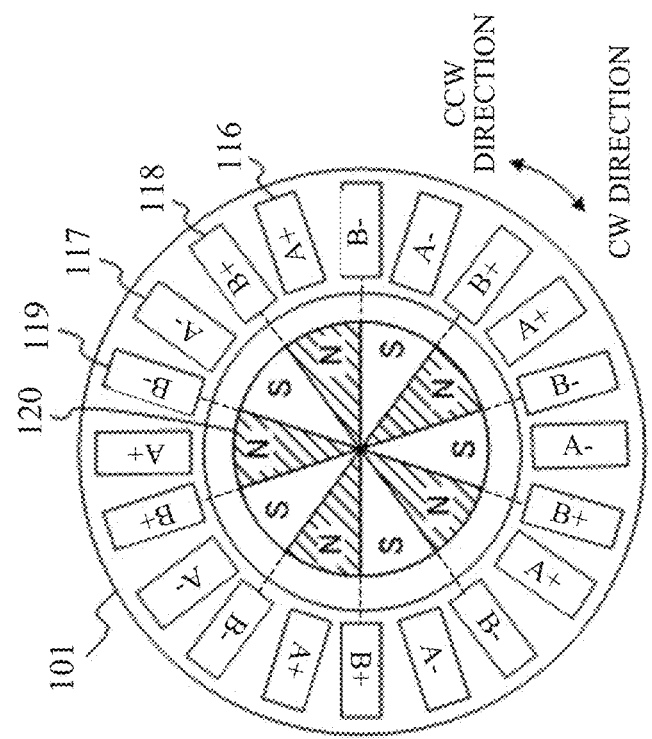
FIGS. 3A to 3C are diagrams each illustrating a configuration of a motor and a position detection sensor according to the first embodiment.
Figure 3B:
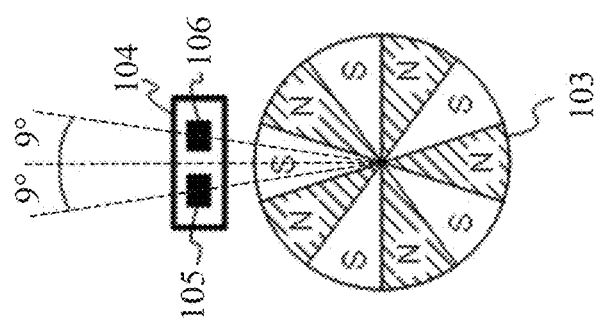
Figure 3A:
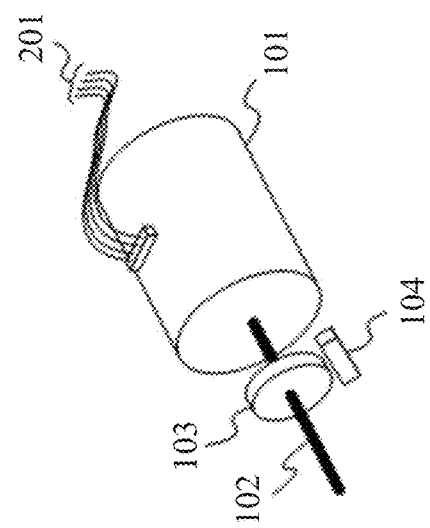

FIG. 3A is an external view of the stepping motor 101. A disk-shaped ENC magnet 103 is fixed to the rotor shaft 102 of the stepping motor 101, and the Hall element unit 104 is held by a support member (not illustrated) at a position where a change in the magnetic field caused by the rotation of the ENC magnet 103 can be detected. Wiring 201 extends from the stepping motor 101 to the outside, and the wiring 201 is connected to the motor driver 113.

FIG. 3B illustrates a positional relationship between the ENC magnet 103 and the Hall element unit 104, that is, the Hall elements 105 and 106. In the ENC magnet 103, five north poles and five south poles are alternately magnetized at each physical angle of 36 degrees in a circumferential direction, i.e., a rotation direction. The Hall elements 105 and 106 are equidistant from the center position of the ENC magnet 103. A physical angle is 9 degrees between a straight line passing through a midpoint between the Hall elements 105 and 106 and the center position of the ENC magnet 103 and each straight line passing through the center of each Hall element and the center position of the ENC magnet 103. With such an arrangement, the detection signals from the Hall elements 105 and 106 have a relationship of having a phase difference of 90 degrees with each other, that is, a relationship of sine and cosine.

The amplifier 107 illustrated in FIG. 2 is configured to amplify the two detection signals from the Hall elements 105 and 106, and to transmit the amplified detection signals to the AD conversion circuit 108. The AD conversion circuit 108 is configured to convert the two input detection signals, which are voltage signals, into numerical values, and to output the results as digital numerical signals (hereinafter referred to as "sensor signals") to the position ENC circuit 109.

The position ENC circuit 109 is configured to adjust offset and gain of the two input sensor signals, and to generate a TAN value from the two adjusted sensor signals which are sine wave signals. The position ENC circuit 109 is further configured to perform an inverse TAN operation on the TAN value for generating rotation angle information, and to integrate this rotation angle information for generating rotation position information. The generated rotation position information is output to the driving waveform generation circuit 110.

The driving waveform generation circuit 110 is configured to set driving to OPEN driving that outputs driving waveforms as two sine wave signals having different phases with a set frequency, and to CLOSE driving that outputs two driving waveforms which are linked with rotation position information from the position ENC circuit 109. This setting is performed in response to an instruction from the CPU 111. The CPU 111 is configured to set a frequency and an amplitude gain of the sine wave signal output in the OPEN driving, and to perform initialization setting of a position count value described later and the like on the position ENC circuit 109.

Figure 4A:
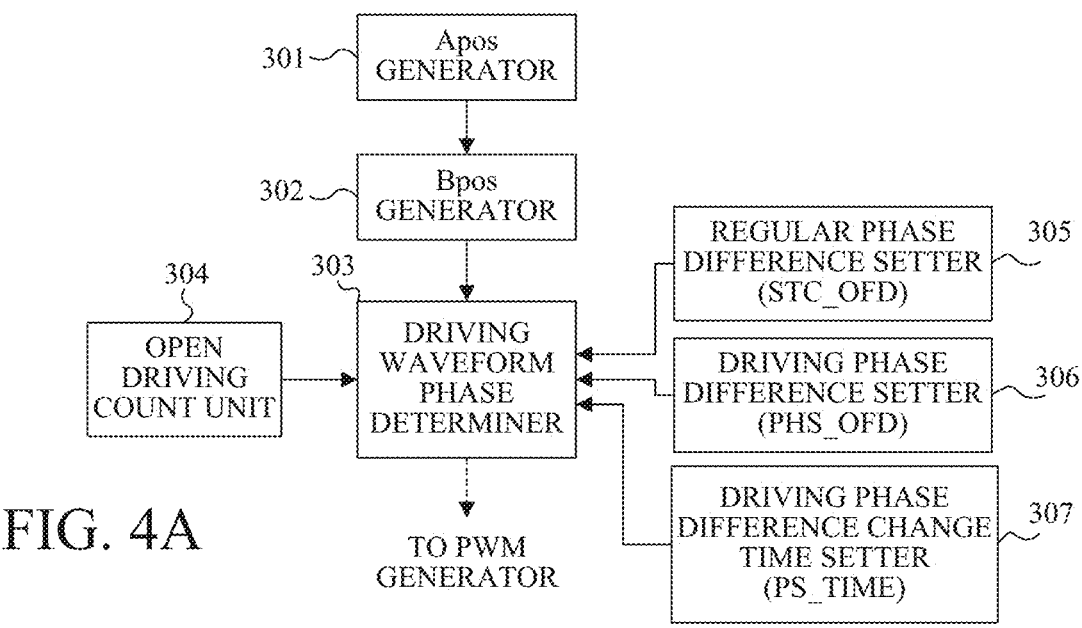
FIGS. 4A to 4E are flowcharts each illustrating processing performed by a position ENC circuit and a driving waveform generation circuit according to the first embodiment.

FIG. 4A illustrates a specific configuration of the position ENC circuit 109 and the driving waveform generation circuit 110. The position ENC circuit 109 includes an Apos generator 301 and a Bpos generator 302, and the driving waveform generation circuit 110 includes a driving waveform phase determiner 303 to a driving phase difference change time setter 307.

The two sensor signals from the Hall elements 105 and 106 and the AD conversion circuit 108 are input to the Apos generator 301 of the position ENC circuit 109. The Apos generator 301 is configured to adjust the offsets and gains of the two sensor signals, and to calculate the rotation position using the adjusted sensor signals. More specifically, as preprocessing, the Apos generator 301 first adjusts the offsets and the gains of the two input sensor signals, which are sine wave signals, so as to make each of the offsets and the gains the same. These adjustments on the offsets and the gains are performed by using peak values and bottom values of the two sine wave signals obtained by rotating the stepping motor 101 by the OPEN driving.

Next, the Apos generator 301 generates a TAN value from two sensor signals having a phase difference of 90 degrees after adjusting the offsets and the gains, and generates rotation position information Apos by integrating the rotation angle information acquired by performing an inverse TAN operation on the TAN value.

Each of FIGS. 5A to 5C illustrates a relationship between the two sensor signals after the adjustments on the offsets and the gains and the rotation position information Apos. FIGS. 5A and 5B illustrate two sensor signals having a phase difference of 90 degrees, and horizontal axes represent rotation amounts. In this embodiment, the rotation position can be detected with a position resolution of 0 to 1023 (1024 counts) when each of two sensor signals outputs one wavelength of a sine wave. Since the ENC magnet 103 has a total of ten N and S poles, a sensor signal of five wavelengths is output with one rotation of the stepping motor 101. FIG. 5C illustrates the rotation position information (detected position count value) Apos obtained from two sensor signals.

The Bpos generator 302 is configured to generate rotation position information Bpos having an arbitrary offset value as compared with the rotation position information Apos. The rotation position information Bpos can be rewritten to an arbitrary value by the CPU 111 at an arbitrary time, and the Bpos generator 302 records a difference amount between the rewritten Bpos and the Apos at the rewriting time as an offset value.

Figure 4B:
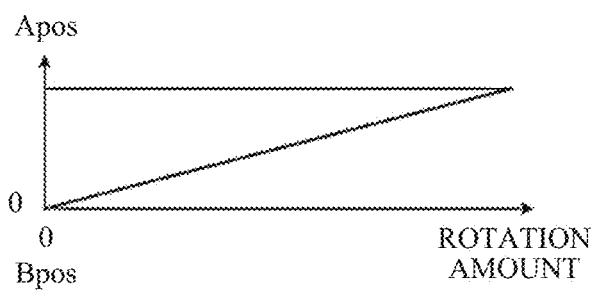
Figure 4C:
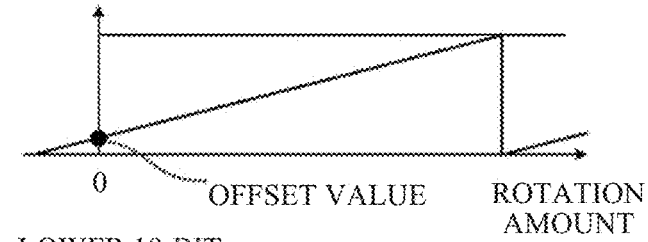

Further, the Bpos generator 302 adds the recorded offset value illustrated in FIG. 4C to the rotation position information Apos illustrated in FIG. 4B at every rotation amount, i.e., every point on the horizontal axis, and generates the rotation position information Bpos. The offset value is associated with an absolute position value that is arbitrarily determined at a time when the reset mechanism 121 operates. The Bpos generator 302 is configured to calculate the rotation position information Bpos having an offset for each rotation of the stepping motor 101, that is, being calculated as an absolute position. The calculated rotation position information Bpos is output to the driving waveform phase determiner 303.

The driving waveform phase determiner 303 is configured to determine phase count information of the driving waveform to be finally applied to the A-phase coil 114 and the B-phase coil 115, and to output a PWM value corresponding to the phase count to the PWM generator 112. The driving waveform phase determiner 303 can set driving to OPEN driving that outputs phase count information based on an instruction from an OPEN driving count unit 304 and to position-linked driving that outputs the phase count information based on the rotation position information Bpos.

The driving can be changed between the OPEN driving and the position-linked driving when the CPU 111 performs change setting on the driving waveform phase determiner 303. When the OPEN driving is to be set, the CPU 111 transmits an instruction on a frequency of the driving waveform to the OPEN driving count unit 304, and the amplitude gain of the driving waveform is set in the driving waveform phase determiner 303, so that the driving waveform phase determiner 303 outputs the driving waveform with the amplitude corresponding to the amplitude gain set in accordance with the instructed frequency.

Figure 4D:
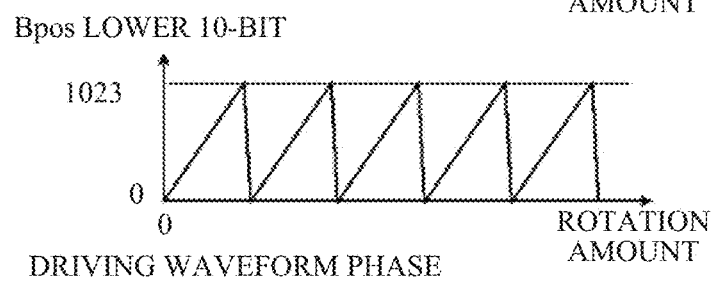

On the other hand, when the position-linked driving is to be set, the CPU 111 calculates a value acquired by giving offset based on an STC_OFS value set via a regular phase difference setter 305 and a PHS_OFFS value set via a driving phase difference setter 306 to a lower 10-bit value of the rotation position information Bpos. This calculated value becomes the phase count value of the driving waveform, and an output value of a phase corresponding to this phase count value is selected as the driving waveform. This relationship is indicated by the graphs in FIGS. 4D and 4E. FIG. 4D indicates the lower 10-bit value of the rotation position information Bpos for the rotation amount, and FIG. 4E indicates the phase of the driving waveform for the rotation amount.

Figure 4E:
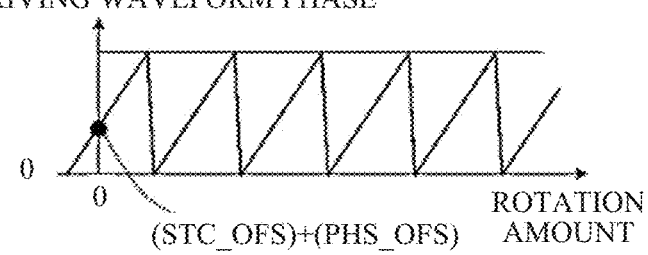

As illustrated in FIGS. 4D and 4E, the phase of the driving waveform is acquired by giving an offset value obtained by adding both the STC_OFS and the PHS_OFS to the lower 10-bit value of Bpos, and it also seems that only one of STC_OFS and PHS_OFFS may be used.

However, the STC_OFS has a role of managing stable positions of the detected position count value and the phase count value of the driving waveform, and the PHS_OFS has a role of managing the phase difference for generating torque. The STC_OFS is a value for preventing the phase of the rotor magnet 120 and the phase of the driving waveform from becoming misaligned at a moment when a position-linking function is turned on/off, and is associated with the offset of Bpos. Further, the PHS_OFS is a value used to determine how many advance angles are set for the driving waveform. Setting the value of PHS_OFS makes it possible to adjust a direction of the rotation of the rotor magnet 120 (rotor shaft 102) and a magnitude of the torque.

The driving waveform generation circuit 110 has a further function with which, when the setting value in the driving phase difference setter 306 is changed, the phase difference is not instantly changed from the phase difference before the setting to the phase difference after the setting, but is gradually changed with a certain period of time. The on/off of this function can be set by the CPU 111, and the CPU 111 sets a phase difference change time PS_TIME in the function in an order of μs to ms on the driving phase difference change time setter 307.

Figures 6A, 6B:
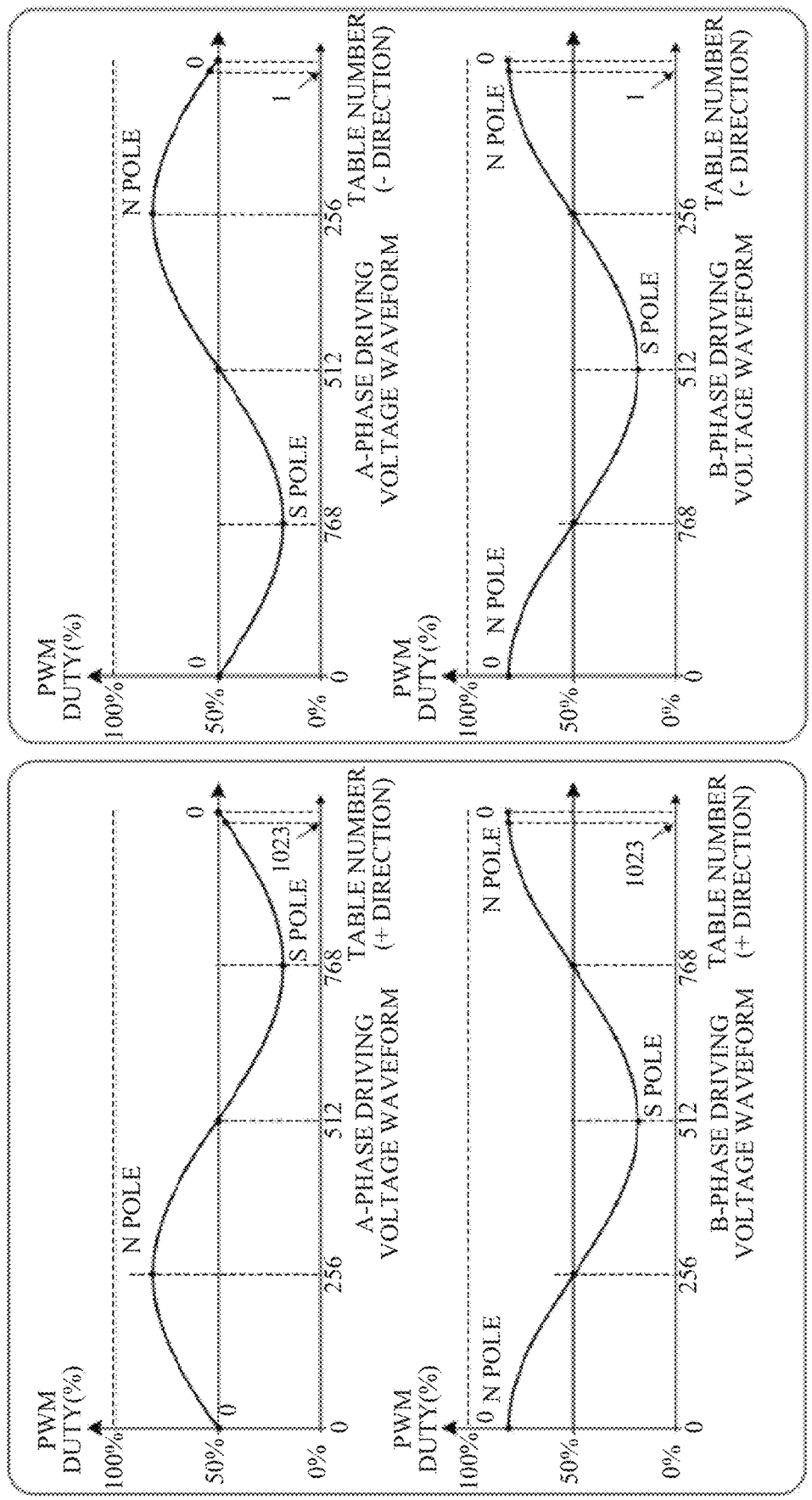
FIGS. 6A and 6B are diagrams illustrating a relationship between a driving waveform and an electric angle according to the first embodiment.

The PWM generator 112 illustrated in FIG. 2 is configured to output, to the motor driver 113a, a PWM signal corresponding to the PWM instruction value output from the driving waveform generation circuit 110. Each of FIGS. 6A and 6B illustrates a relationship between the count value of the electric angle of each of the A and B phases and the PWM instruction value. In each of FIGS. 6A and 6B, a horizontal axis indicates a table number and has resolution of 1024 counts as in the driving waveform of FIG. 4E. A vertical axis indicates a duty % value as the PWM instruction value. An A-phase driving voltage waveform is a driving waveform applied to the A-phase coil 114, which will be referred to as an "A-phase waveform" hereinafter, and a B-phase driving voltage waveform is a driving waveform applied to the B-phase coil 115, which will be referred to as a "B-phase waveform" hereinafter.

FIG. 6A indicates a case where the table number is counted in a plus direction, the B-phase waveform precedes the A-phase waveform by 90 degrees, and the stepping motor 101 rotates in a clockwise (CW) direction. FIG. 6B indicates a case where the table number is counted in a minus direction, the A-phase waveform precedes the B-phase waveform by 90 degrees, and the stepping motor 101 rotates in a counterclockwise (CCW) direction. The duty % value of the vertical axis increases or decreases depending on the gain setting value from the CPU 111, but in this embodiment, it is assumed that a proper value is set for the rotation of the stepping motor 101.

The motor driver 113 is configured to amplify the PWM instruction value output from the PWM generator 112 and to apply a driving voltage to each of the A-phase coil 114 and the B-phase coil 115. The driving voltage to be applied is a high-frequency signal corresponding to the PWM signal. However, it is assumed that the sinusoidal driving voltage illustrated in each of FIGS. 6A and 6B is effectively applied to the coils, because an inductance (L) component of each coil functions as a low-pass filter for a current value signal generated in each coil.

The stator A+ 116 and the stator A− 117 illustrated in FIG. 2 are configured to concentrate and emit the magnetic fields generated at both ends of the A-phase coil 114, respectively. The stator B+ 118 and the stator B− 119 are configured to concentrate and emit the magnetic fields generated at both ends of the B-phase coil 115, respectively. FIG. 3C illustrates a positional relationship between the stator group (stator A+ 116, stator A− 117, stator B+ 118 and stator B− 119) and the rotor magnet 120.

As illustrated in FIG. 3C, five sets of the stator A+ 116, the stator B+ 118, the stator A− 117, and the stator B− 119 are arranged in the CCW direction while the stators are arranged in this order at each physical angle of 18 degrees. The rotor magnet 120 is disposed on the center of the stator group, and has a total of ten poles having alternately-arranged five N poles and five S poles in the rotation direction. The rotor magnet 120 rotates by a physical angle of 72 degrees each time when a sine wave of a driving waveform is output for one wavelength, and rotates by a physical angle of 360 degrees when a sine wave of a driving waveform is output for five wavelengths.

In this embodiment, a description is given for the case where both the ENC magnet 103 and the rotor magnet 120 have 10 poles, but the number of poles of each can be suitably selected.

Figure 12:
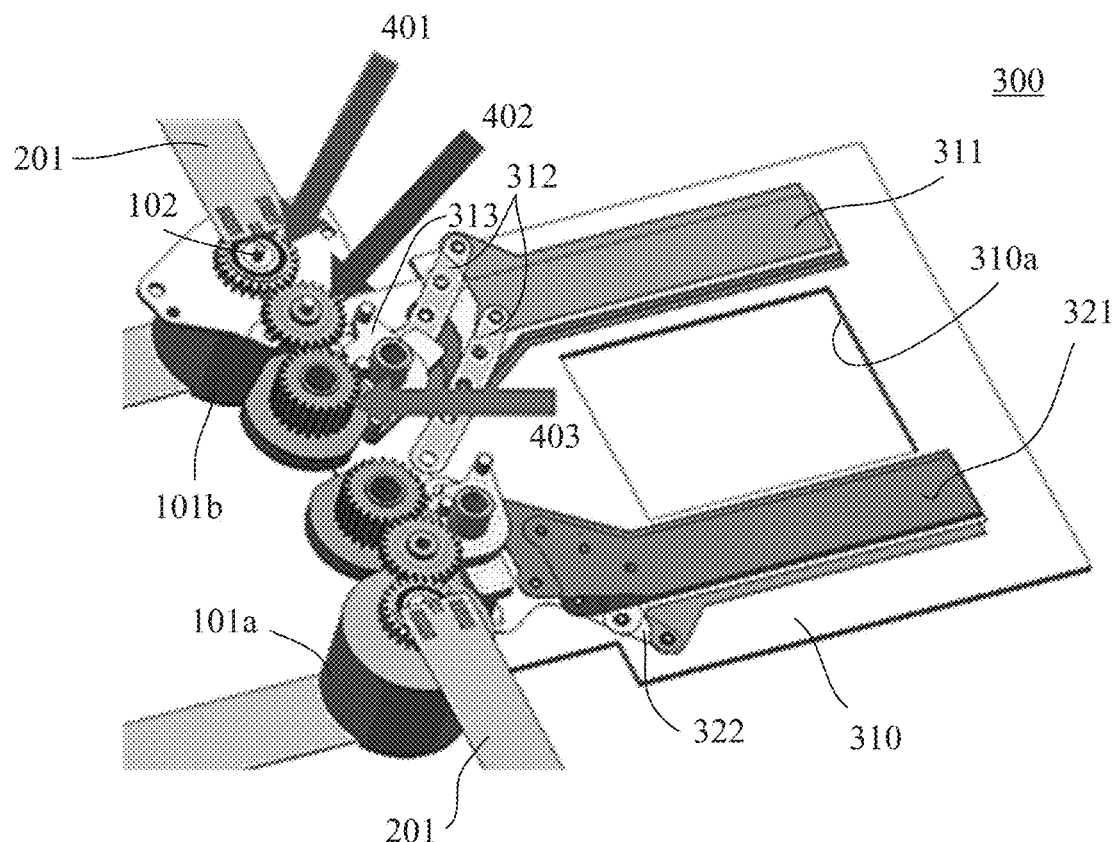
FIG. 12 is a diagram illustrating a configuration of a focal plane shutter unit using the motor controlled by the motor control apparatus according to the first and second embodiments.
Figure 13:
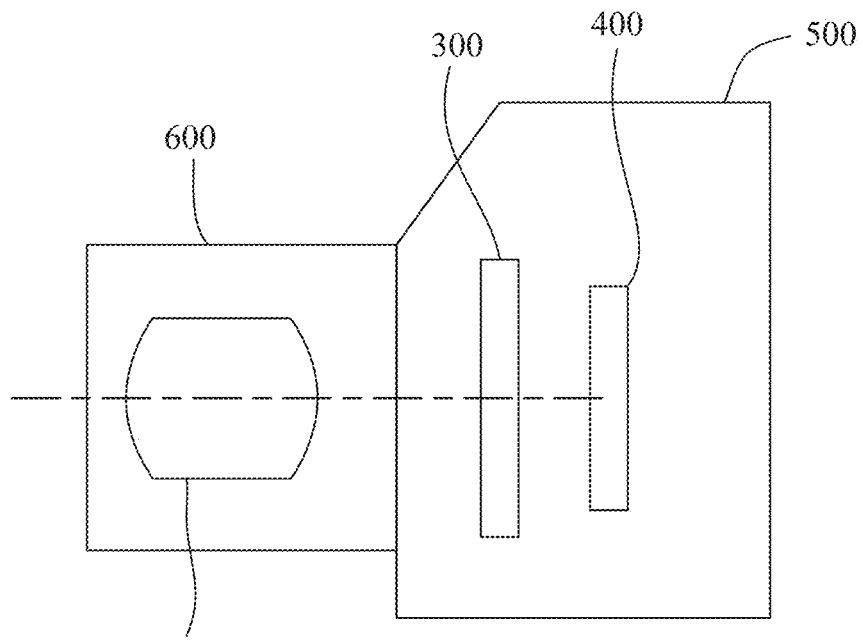
FIG. 13 is a diagram illustrating a configuration of a digital camera including the focal plane shutter unit according to the first and second embodiments.

FIG. 12 illustrates a configuration of a focal plane shutter unit 300 as an optical unit using the stepping motor 101 (100a, 100b) as a driving source. The focal plane shutter unit 300 is included in a digital camera 500 as an image pickup apparatus (optical apparatus) illustrated in FIG. 13, and is configured to control an exposure amount for an image sensor 400, such as a CMOS sensor, exposed to light from an image pickup optical system 601 in an interchangeable lens 600.

The focal plane shutter unit 300 includes a shutter base 310 having an aperture 310a through which light passes, a front curtain unit and a rear curtain unit each of which is configured to open and close the aperture 310a, a front curtain stepping motor 101a, a rear curtain stepping motor 101b, and a front curtain driving system and a rear curtain driving system that transmit the rotations of the stepping motors 101a and 101b to the front curtain unit and the rear curtain unit, respectively. The wiring 201 for applying a driving voltage to the stepping motors 101a and 101b is connected to the stepping motors 101a and 101b.

The front curtain unit includes a plurality of front curtain shutter blades 311, two front curtain arms 312 rotatably connected to the front curtain shutter blades 311, and a front curtain driving lever 313 configured to rotate one front curtain arm 312. The rear curtain unit includes a plurality of rear curtain shutter blades 321, two rear curtain arms 322 rotatably connected to the rear curtain shutter blades 321, and a rear curtain driving lever 323 configured to rotate one of the rear curtain arms 322.

Figure 7:
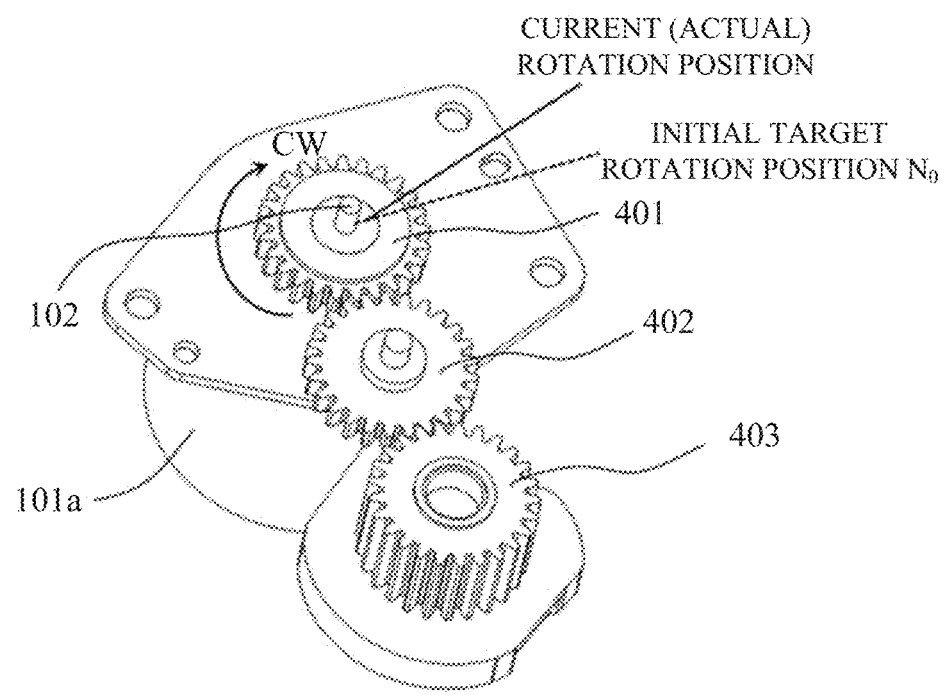
FIG. 7 is a diagram illustrating a configuration example of a driving target according to the first embodiment.

FIG. 7 is an enlarged view illustrating the front curtain driving system. The front curtain driving system includes a first driving gear 401 fixed to a rotor shaft 102 of the front curtain stepping motor 101a, an idler gear 402 that engages with the first driving gear 401, and a second driving gear 403 that engages with the idler gear 402. The second driving gear 403 is connected to the front curtain driving lever 313. The configuration of the rear curtain driving system is the same as that of the front curtain driving system.

When the front curtain stepping motor 101a is rotated, the rotation is transmitted to the front curtain driving lever 313 via the first driving gear 401, the idler gear 402 and second driving gear 403, the front curtain driving lever 313 rotates to make the front curtain arm 312 rotate, and the front curtain shutter blades 311 travel. Similarly, when the rear curtain stepping motor 101*b* is rotated, the rotation is transmitted to the rear curtain driving lever 323 via the first driving gear 401, the idler gear 402 and the second driving gear 403, the rear curtain driving lever 323 rotates to make the rear curtain arms 322 rotate, and the rear curtain shutter blades 321 travel.

When the image sensor is to be exposed, the rotation of the front curtain stepping motor 101*a* causes the front curtain shutter blades 311 to travel from an initial position where the front curtain shutter blades 311 become an unfolded state, i.e., a closed state, to a traveling end position where the front curtain shutter blades 311 become a folded state, i.e., an opened state. After a predetermined shutter speed passes, the rotation of the rear curtain stepping motor 101*b* causes the rear curtain shutter blades 321 to travel from an initial position where the rear curtain shutter blades 321 become a folded state to a traveling end position where the rear curtain shutter blades 321 become an unfolded state. After the exposure is completed, the rotations of the front and rear curtain stepping motors 101*a* and 101*b* cause the front and rear curtain shutter blades 311 and 321 to travel and to return from the traveling end positions to the initial positions. In this way, the front and rear curtain units are driven by the front and rear curtain stepping motors 101*a* and 101*b* in both the opening direction and the closing direction.

In this embodiment, the rotation of the rotor shaft 102 acts directly on the front and rear curtain units, and therefore the rotation amounts of the stepping motors 101*a* and 101*b* during and after the exposure is smaller than the physical angle of 360 degrees, i.e., one rotation.

As described above, each of the rotation positions of the stepping motors 101*a* and 101*b* can be acquired by the Hall elements 105 and 106 detecting the change in the magnetic field generated by the ENC magnet 103. The ENC magnet may be provided so that the ENC magnet rotates integrally with the gears of the front and rear curtain driving systems, and the rotation position of the stepping motor may be acquired by converting rotation position information using a gear ration, the rotation position information being obtained by the Hall element detecting the change in the magnetic field caused by the rotation of the gear. This is also applied to when an optical encoder is used instead of the magnetic encoder.

At the time of exposure of the image sensor described above, as illustrated in FIG. 7, the front curtain stepping motor 101*a* is rotated from the initial target rotation position N0 in the CW direction and makes the front curtain unit travel from an initial position in which the front curtain unit is in the unfolded state to an opening position in which the front curtain unit is in the folded state. After the exposure is completed, the stepping motor 101*a* is rotated in the CCW direction to the initial target rotation position N0 and makes the front curtain unit return from the opening position to the initial position. The same applies to the rear curtain stepping motor 101*b*.

The initial target rotation position N0 can be set to an arbitrary rotation position. The first driving gear 401 may include a stopper, and the initial target rotation position N0 may be set to a rotation position at which the stepping motor 101*a* is forcibly stopped by the stopper coming into contact with a contact portion of the shutter base 310 when the stepping motor 101*a* performs return rotation in the CCW direction. When a strong collision between the stopper and the contact portion is to be avoided, the initial target rotation position N0 may be set to an initial target rotation position N0 in the CW direction slightly more than the rotation position where the stopper comes into contact with the contact portion.

The configurations of the front and rear curtain driving systems may be configurations which are different from the configuration illustrated in FIG. 7, as long as the rotation of the rotor shaft 102 directly acts on the front and rear curtain units. For example, a driving lever may be used instead of the driving gear.

In the focal plane shutter unit configured as described above, if the traveling trajectories of the shutter blades, especially the traveling trajectories in exposure sections, deviate even slightly from the target traveling trajectories, uneven exposure on the image sensor occurs. Hence, it is required that the stepping motor 101 is controlled so that the traveling trajectories of the shutter blades approach or coincide with predetermined target traveling trajectories even when there is a factor, that changes the traveling trajectory of the shutter blade, such as a temperature change and a mechanical change over time.

In this embodiment, position feedback control is performed on the stepping motor 101 so that fluctuation in the traveling trajectory is reduced and the actual traveling trajectory approaches or coincides with the target traveling trajectory. The above-mentioned initial target rotation position N0 is used for calculating an initial position deviation in this position feedback control.

Figure 8:
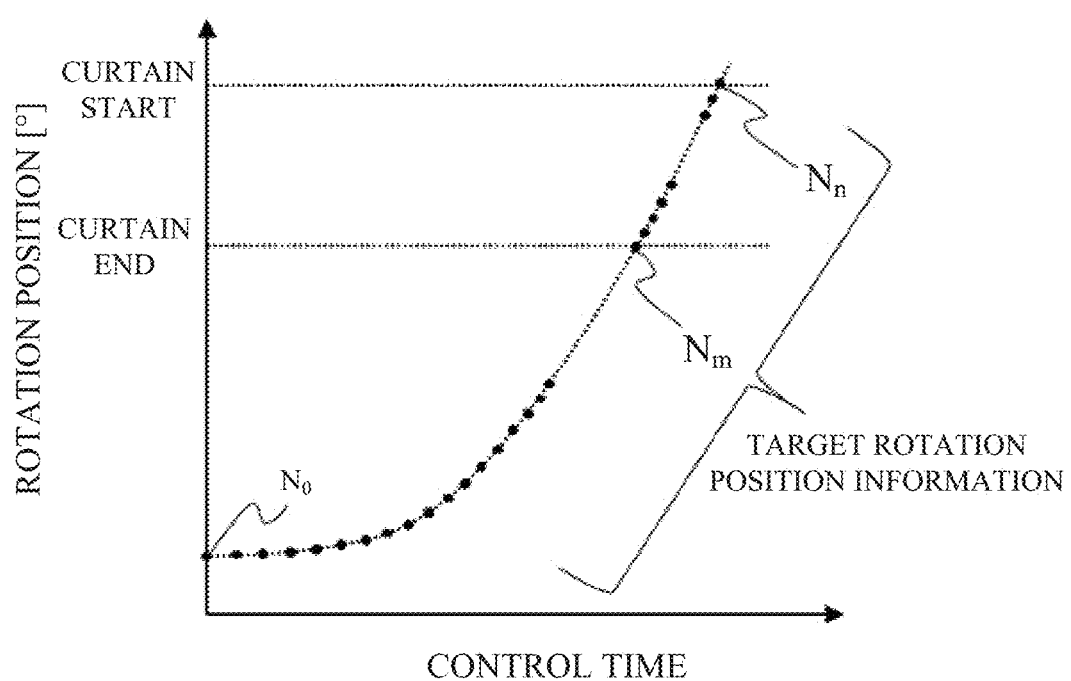
FIG. 8 is a diagram illustrating target rotation position information according to the first embodiment.

FIG. 8 illustrates a relation between a trajectory of a plurality of target rotation positions of the stepping motor 101 indicated by a vertical axis and control time indicated by a horizontal axis, during the position feedback control, that is, illustrates the target traveling trajectory of the shutter blade. When the stepping motor 101 is rotated in the CW direction from the initial target rotation position N0, which is a first (initial) target rotation position in the position feedback control, and makes the shutter blade travel, a time lag is a time to reach an exposure start position indicated as a curtain start Nm in the drawing, and a curtain speed is a traveling time from the curtain start Nm to an exposure end position indicated as a curtain end Nn. The time lag and the curtain speed are determined as specifications for each product of the focal plane shutter unit, and it is necessary to control the stepping motor 101 so as to satisfy the specifications. A deviation between the actual traveling trajectory and the target traveling trajectory in the exposure section from the curtain start Nm to the curtain end Nn leads to uneven exposure, and thus high control accuracy is required.

In this embodiment, the trajectory (set) of the target rotation positions of the stepping motor 101 in the traveling section from the initial target rotation position N0 to the curtain end Nn is stored as target rotation position information, and the stepping motor 101 is controlled by the position feedback control so that the trajectory of the actual rotation positions of the stepping motor 101 approaches or coincides with the trajectory of the target rotation positions.

The target rotation position information is information on each control cycle of the CPU 111, and as the target rotation position information, representative data may be used under a certain driving condition, the representative data being data in which the time lag and the curtain speed satisfy the specifications. Further, as the target rotation position information, data to be used may not be based on data obtained by actually driving the stepping motor 101, but the data to be used may be arbitrarily generated within a range with which the stepping motor 101 can be driven.

For example, when the control cycle of the CPU 111 is 16 kHz (62 µs) and a time required for traveling from the initial target rotation position N0 to the curtain end Nn is 10 ms, about 162 pieces of data for every 62 µs is prepared as the target rotation positions indicated by dots in the drawing (partially omitted) included in the target rotation position information. Data on a target rotation position after the curtain end Nn may be stored. The number of pieces of data on the control cycle and the target rotation position included in and target rotation position information can be properly selected.

A torque characteristic of the stepping motor 101 changes depending on the temperature. Generally, the torque characteristic is improved in a low temperature environment, and the torque characteristic is lowered in a high temperature environment. When the position feedback control is not performed for certain target rotation position information, the actual rotation position of the stepping motor 101 is likely to exceed the target rotation position in the low temperature environment, and is likely to fall below the target rotation position in the high temperature environment. When position feedback control is performed on such a stepping motor 101, the trajectory of the actual rotation positions may deviate from the trajectory of the target rotation positions from the initial target rotation position N0 to a certain target rotation position. However, if the actual rotation position approaches or coincides with the target rotation position by the time the curtain start Nm is reached, and the trajectory of the actual rotation positions approaches or coincides with the trajectory of the target rotation positions from the curtain start Nm to the curtain end Nn, the uneven exposure can be suppressed.

Figure 9A:
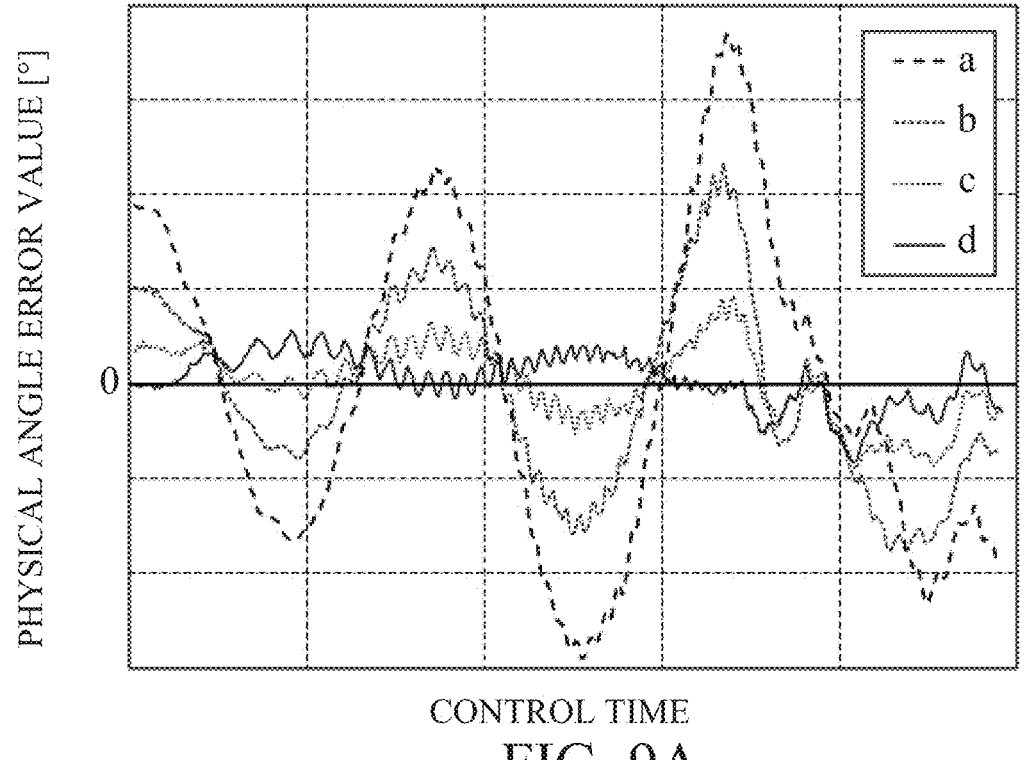
FIGS. 9A and 9B are diagrams each illustrating a relationship between the initial position deviation and controllability according to the first embodiment.
Figure 9B:
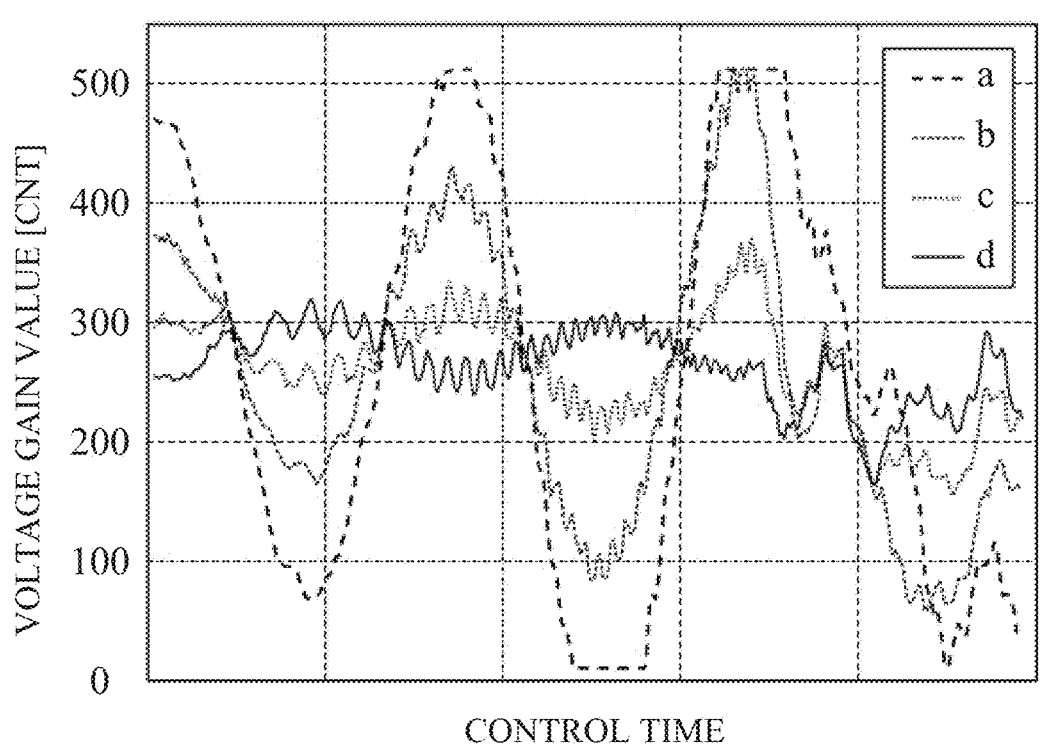

FIGS. 9A and 9B illustrate a relationship between the initial position deviation and the position feedback controllability in this embodiment. FIG. 9A illustrates physical angle error values when the position feedback control is performed from the initial target rotation position N0 to the curtain end Nn, and FIG. 9B illustrates voltage gain values in the same case.

The initial target rotation position N0 is a rotation position in the CW direction slightly more than the rotation position where the above-described stopper and the contact portion come into contact with each other, and the position feedback control starts from a rotation position that is shifted by initial position deviations of a, b, c, and d in the CCW direction from the initial target rotation position N0. The initial position deviations become smaller in an order of a>b>c>d, and d is almost 0. The position feedback control uses PID (proportional-integral-differential) control, determines the output control amount by using, as input, a position deviation, that is, an error value of the physical angle, and controls the voltage gain value, that is, the driving voltage applied to the stepping motor 101. Specifically, the driving voltage applied to the stepping motor 101 is controlled by adjusting the voltage gain value from 0 to 511, i.e., for 512 counts. Driving conditions of the stepping motors 101 other than the initial position deviations a, b, c, and d are the same, and use the same advance angle value and the same PID parameter. Instead of the PID control, various control methods such as PI control and PD control may be used.

In FIGS. 9A and 9B, the larger the initial position deviation is, the more greatly undulating line the physical angle error values describe, while the voltage gain values also describe a greatly undulating line as well for correcting the error values. With the initial position deviation a, the line oscillates and the controllability is extremely low. With the initial position deviation b, the line also indicates the tendency of oscillation. With the initial position deviation c, the physical angle error values converge to some extent, and with the initial position deviation d, the best controllability is acquired.

If the physical angle error values are large from the curtain start Nm to the curtain end Nn, uneven exposure that cannot be allowed occurs. Thus, an allowable value for the initial position deviation is determined based on an allowable uneven exposure. Therefore, it is important to make the initial position deviation as small as possible in the position feedback control on the stepping motor 101 used as the driving source of the focal plane shutter unit.

Figure 10:
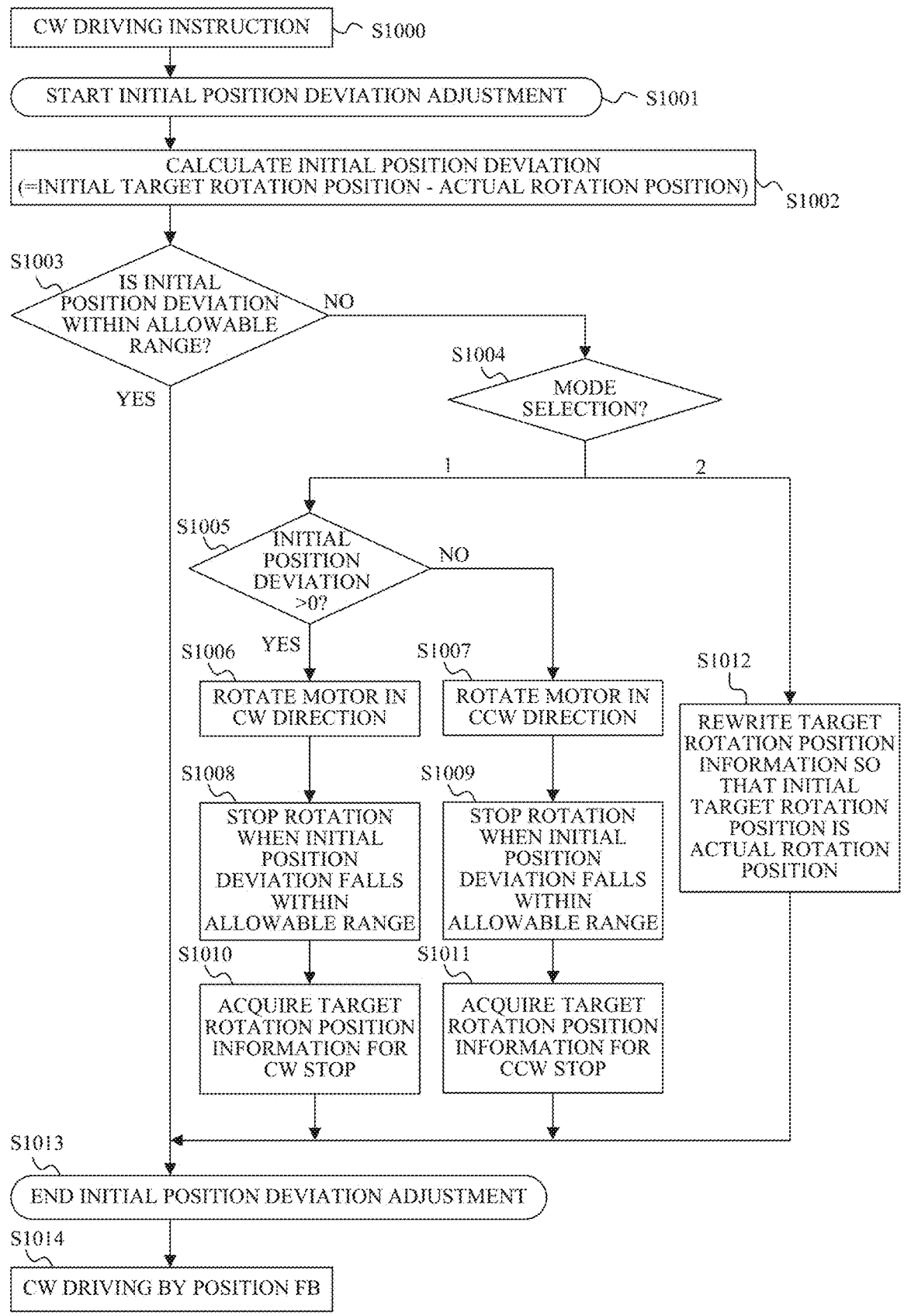
FIG. 10 is a flowchart illustrating processing according to the first and second embodiments.

The flowchart of FIG. 10 illustrates control processing (control method) for the stepping motor 101, specifically, processing executed by the controller 16 and the initial position deviation adjustment unit 17 each of which is illustrated in FIG. 1. The controller 16 and the initial position deviation adjustment unit 17, each of which is configured by a computer, executes this processing in accordance with a computer program. Before step S1000, the stepping motor 101 is driven in the CCW direction while the initial target rotation position N0 is set as a target stop position, so that the shutter blade returns to the initial position, the shutter blade having traveled to the traveling end position in previous exposure. However, depending on stop accuracy of the stepping motor 101, the actual stop position may vary, and the initial position deviation may change.

When exposure, that is, driving of the stepping motor 101 in the CW direction is instructed in step S1000, the initial position deviation adjustment unit 17 starts the initial position deviation adjustment processing in step S1001.

First, the initial position deviation adjustment unit 17 calculates the initial position deviation in step S1002. The initial position deviation is calculated as a difference between the initial target rotation position N0 and the current actual rotation position. The initial target rotation position N0 is an initial target rotation position in the target rotation position information having been used in the control on the stepping motor 101 at the time of the previous exposure. For the current actual rotation position, the rotation position information is acquired via the CPU 111, the rotation position information being generated by the position ENC circuit 109 using the detection signals from the Hall elements 105 and 106 illustrated in FIG. 2.

In the following step S1003, the initial position deviation adjustment unit 17 determines whether or not the obtained initial position deviation is within an allowable range. The allowable range of the initial position deviation is determined depending on an allowable range of uneven exposure. If the initial position deviation is within the allowable range, the initial position deviation adjustment unit 17 uses the target rotation position information held by the target rotation position holding unit 15 as it is for the position feedback control. In this case, the initial position deviation adjustment processing ends, and in step S1013, the controller 16 drives the stepping motor 101 in the CW direction by the position feedback control using the target rotation position information.

On the other hand, if the initial position deviation is not within the allowable range, the position feedback controllability deteriorates, and thus adjustment is required to reduce this initial position deviation. The initial position deviation adjustment unit 17 proceeds to step S1004 and selects a mode. The case where mode 1 (first processing) is selected will be described below. The case where mode 2 (second processing) is selected will be described in the second embodiment.

In the mode 1, in step S1005, the initial position deviation adjustment unit 17 determines whether or not the initial position deviation is larger than 0. If the initial position deviation is larger than 0, the current actual rotation position is located on the CCW side of the initial target rotation position N0, and if the initial position deviation is smaller than 0, the current rotation position is on the CW side of the initial target rotation position N0. If the current actual rotation position is located on the CCW side of the initial target rotation position N0, the initial position deviation adjustment unit 17 proceeds to step S1006. If the current actual rotation position is located on the CW side of the initial target rotation position N0, the initial position deviation adjustment unit 17 proceeds to step S1007.

In step S1006, the initial position deviation adjustment unit 17 drives the stepping motor 101 in the CW direction. In this case, the stepping motor 101 may be driven by any of the OPEN driving and the CLOSE driving, but the OPEN driving is more preferable from the viewpoint of the stop position accuracy.

Subsequently, in step S1008, the initial position deviation adjustment unit 17 monitors the actual rotation position and the initial position deviation of the stepping motor 101. When the initial position deviation falls within the allowable range, the initial position deviation adjustment unit 17 stops the driving of the stepping motor 101 in the CW direction.

Subsequently, in step S1010, the initial position deviation adjustment unit 17 acquires target rotation position information corresponding to the initial position deviation adjustment in the CW direction, from two pieces of pre-stored target rotation position information respectively corresponding to the initial position deviation adjustments in the rotation directions (CW direction and CCW direction) of the stepping motor 101. Thereafter, the initial position deviation adjustment unit 17 changes (or updates) the target rotation position information held by the target rotation position holding unit 15 to the acquired target rotation position information.

On the other hand, in step S1007, the initial position deviation adjustment unit 17 drives the stepping motor 101 in the CCW direction. In this case, the stepping motor 101 may be driven by any of the OPEN driving and the CLOSE driving, but the OPEN driving is more preferable from the viewpoint of the stop position accuracy.

Subsequently, in step S1009, the initial position deviation adjustment unit 17 monitors the actual rotation position and the initial position deviation of the stepping motor 101. When the initial position deviation falls within the allowable range, the initial position deviation adjustment unit 17 stops the driving of the stepping motor 101 in the CCW direction.

Subsequently, in step S1011, the initial position deviation adjustment unit 17 acquires target rotation position information corresponding to the initial position deviation adjustment in the CCW direction, from the above two pieces of target rotation position information, and changes (or updates) the target rotation position information held by the target rotation position holding unit 15 to the acquired target rotation position information.

The target rotation position information differs between the CW direction and the CCW direction because, depending on the rotation direction of the stepping motor 101, a direction is different in which each space, i.e., each gap, occurs due to backlashes between the first driving gear 401, the idler gear 402 and the second driving gear 403. It is necessary to rotate the stepping motor 101 so that the direction in which the gap appears become the same. Hence, the target rotation position information is different depending on the rotation direction. The target rotation position information for each rotation direction differs in at least a part of the target rotation positions from the initial target rotation position to before the curtain start Nm. The target rotation positions from the curtain start Nm to the curtain end Nn are the same regardless of the rotation directions of the initial position deviation adjustment.

If the stepping motor 101 is driven in the CW direction in step S1013 from a state in which the backlash in the CW direction is eliminated, although not illustrated in FIG. 10, in step S1007, the stepping motor 101 may be driven in the CCW direction of the initial target rotation position N0, and then the processes of steps S1006, S1008, and S1010 may be performed. However, if the effect of backlash is small as in the case where the gap between the gears is eliminated, the same target rotation position information may be used regardless of the rotation direction of the stepping motor 101.

When the initial position deviation adjustment processing is completed in step S1010 or step S1011, the controller 16 drives the stepping motor 101 in the CW direction by the position feedback control using the changed target rotation position information in step S1013.

As described above, this embodiment makes the actual rotation position of the stepping motor 101 approach or coincide with the initial target rotation position, that is, makes the initial position deviation fall within the allowable range, and thereafter starts the position feedback control on the stepping motor 101. Thereby, when the position feedback control is performed on the stepping motor 101 that is required to have high speed followability within a small rotation amount (or short control time), the initial position deviation can be reduced and good controllability can be acquired.

Second Embodiment

Next, a description will be given of the second embodiment of the present disclosure. In this embodiment, a description will be given of initial position deviation adjustment processing which is different from the initial position deviation adjustment processing executed by the initial position deviation adjustment unit 17 described in the first embodiment. The configuration of the motor control apparatus for controlling the stepping motor 101 and the method for position feedback control are the same as those in the first embodiment. In this embodiment, a description will be given of a case where the mode 2 is selected in step S1004 in the flowchart of FIG. 10.

In the mode 2, in step S1012, the initial position deviation adjustment unit 17 does not rotate the stepping motor 101 to make the initial position deviation fall within the allowable range as in mode 1, but changes the initial target rotation position N0 so as to make the initial target rotation position approach or coincide with the actual rotation position. Further, the target rotation position information held by the target rotation position holding unit 15 is changed when the initial target rotation position N0 is changed.

Figure 11A:
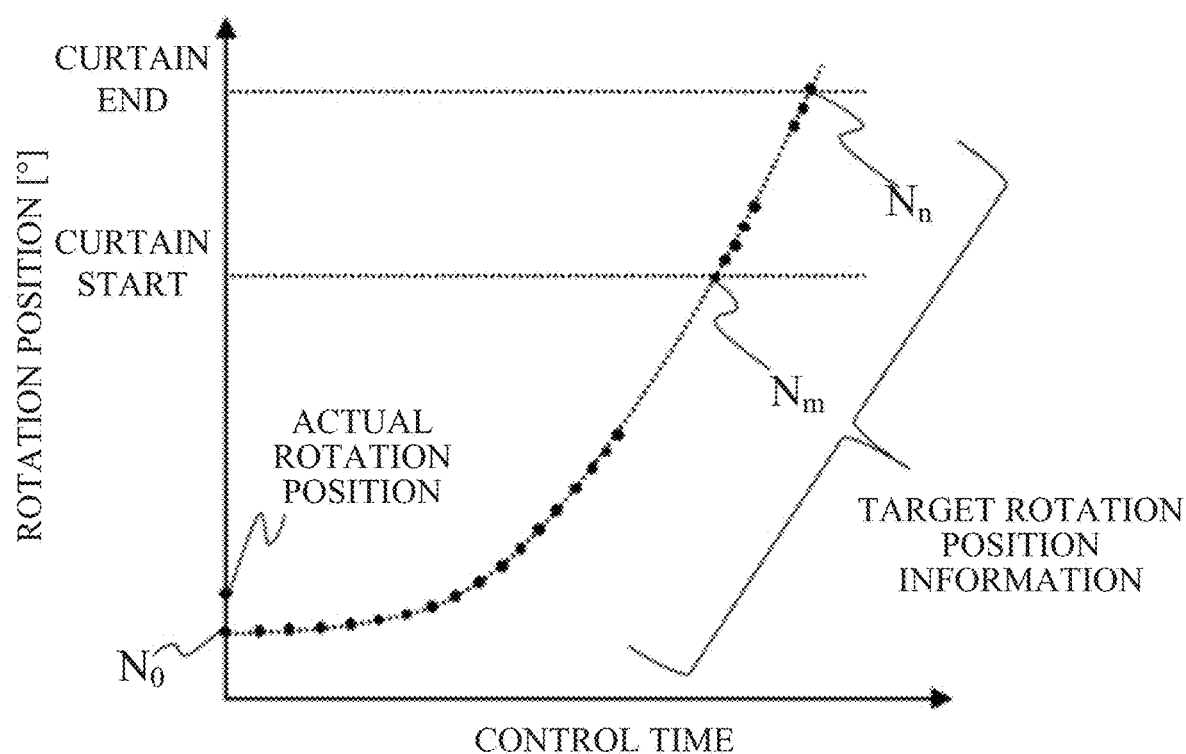
FIGS. 11A and 11B are diagrams each illustrating update of target rotation position information according to the second embodiment.

A description will be given of the change in the target rotation position information in step S1012 with reference to FIGS. 11A and 11B. FIG. 11A illustrates a relationship between the target rotation position information before the update and the actual rotation position in step S1000. The actual rotation position is located on the CW side of the initial target rotation position N0.

Figure 11B:
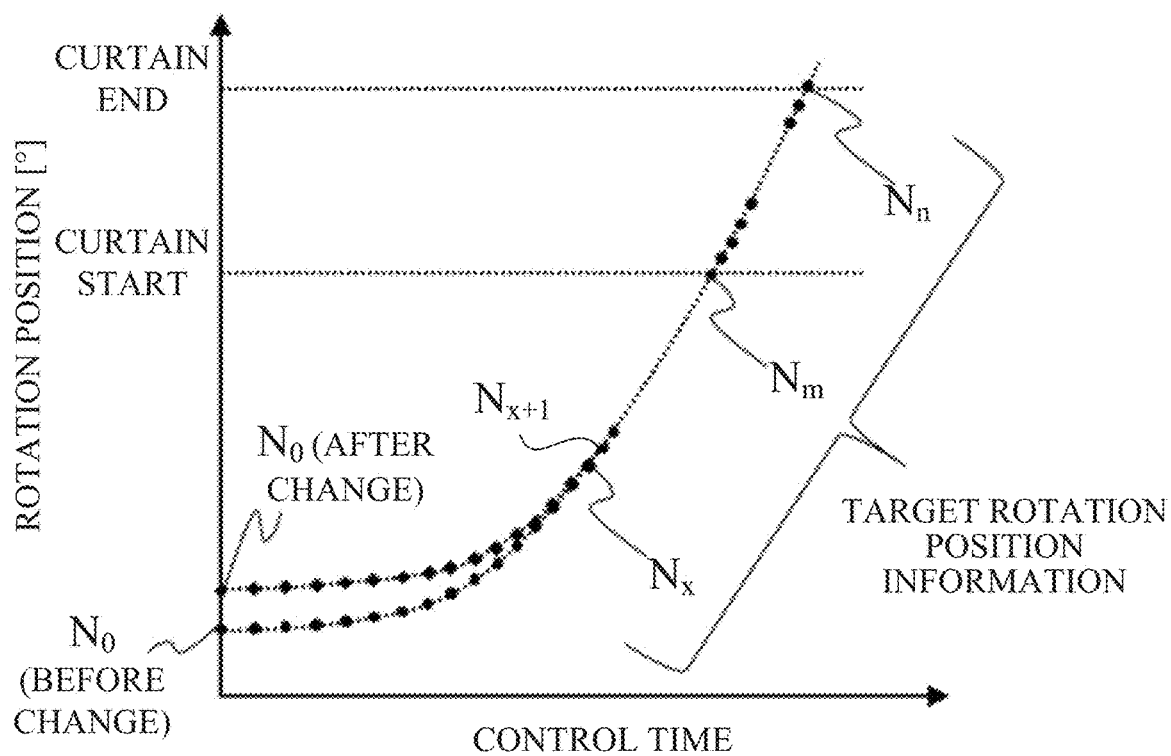

In order to reduce this initial position deviation, the initial position deviation adjustment unit 17 changes the initial target rotation position N0 to make the initial target rotation position N0 approach or coincide with the actual rotation position, as illustrated in FIG. 11B. Further, the initial position deviation adjustment unit 17 newly calculates second to X-th target rotation positions N1 to Nx so that a trajectory from the changed initial target rotation position N0 to an arbitrary X-th target rotation position Nx, which is second or after and before the curtain start Nm, is smoothly connected to a trajectory from the (X+1)-th target rotation position Nx+1. The initial position deviation adjustment unit 17 changes the target rotation position held by the target rotation position holding unit 15 by using the newly calculated target rotation positions N1 to Nx. At this time, the target rotation positions from Nx+1 to curtain start Nm and from curtain start Nm to curtain end Nn are not changed.

If the actual rotation position is on the CCW side of the initial target rotation position N0 before the change, the same initial position deviation adjustment processing is performed. In this case, the trajectory indicated by the changed target rotation position information is a trajectory starting from the CCW side of the trajectory indicated by the target rotation position information before the change.

When the initial position deviation adjustment processing is completed, the controller 16 drives the stepping motor 101 in the CW direction by the position feedback control using the target rotation position information changed in step S1013.

It is also possible to add a step for determining the mode selected in step S1004, and to select the mode 1 or mode 2 properly depending on the determination result. In the mode 1, since the stepping motor 101 is rotated, longer processing time is required than that in the mode 2. In the mode 2, if the actual rotation position greatly deviates from the initial target rotation position N0 on the CW side, the traveling (acceleration) section to the curtain start Nm becomes shorter, the curtain speed may become slower and the specification may not be satisfied. The modes may be properly selected such that if the initial position deviation is too large on the CW side and is more than a first predetermined value, the mode 1 is selected even though the mode 1 requires long processing time, and if the initial position deviation is smaller than a second predetermined value, the mode 2 may is selected.

Both the mode 1 and mode 2 may be selected in the mode selection in step S1004. In steps S1008 and S1009 of the mode 1, the actual rotation position of the stepping motor 101 is monitored, and when the initial position deviation falls within the allowable range, the rotation of the stepping motor 101 is stopped. At this time, the rotation position after stopping may be slightly deviated due to uneven magnetization of the rotor magnet 120 or mechanical interference with the rotation of the rotor magnet 120. In such a case, it is possible to reduce the initial position deviation to which the deviation has been added, by using the mode 2. The processing in this case may be performed by proceeding to step S1012 after step S1008 or step S1009, or by proceeding to step S1012 after step S1010 or step S1011.

As described above, this embodiment makes part of the target rotation position information including the initial target rotation position of the target rotation position information approach or coincide with the actual rotation position of the stepping motor 101, that is, makes the initial position deviation fall within the allowable range, and thereafter starts the position feedback control on the stepping motor 101. Thereby, when the position feedback control is performed on the stepping motor 101 that is required to have high speed followability within a small rotation amount (or short control time), the initial position deviation can be reduced and good controllability can be acquired.

The focal plane shutter unit is not limited to the configuration in which both the front curtain and the rear curtain travel when the shutter blade opens and closes as explained in the first and second embodiments, but may be a configuration in which an electronic shutter of the image sensor is used as the front curtain and only the rear curtain travels when the shutter blade opens and closes. For the stepping motor used in the focal plane shutter unit such as the latter, the processing may be performed of reducing the initial position deviation described in the first and second embodiments.

Also, in the first and second embodiments, the target rotation position information is the same from the curtain start Nm to the curtain end Nn for the front curtain and the rear curtain, but when the exposure control on the front curtain changes, the target rotation position information from the curtain start Nm to the curtain end Nn of the rear curtain may be changed in accordance with the exposure control on the front curtain. For example, in the second embodiment, the target rotation position information of the front curtain may be generated to the curtain end Nn, and in this case, the target rotation position information of the exposure section is changed before and after the generation. For the shutter unit, it is sufficient if the trajectories of the blades of the front curtain and the rear curtain are coincide with each other in the exposure section, and thus the target rotation position information of the rear curtain in the exposure section may be made coincide with the changed target rotation position information of the front curtain in the exposure section.

In addition, if the controllability of the front curtain is changed due to changes over time or deterioration, it is difficult to continue using the data on the exposure section in the target rotation position information, and the information may be changed by internal processing of the computer. In this case as well, the target rotation position information in the exposure section of the rear curtain may be made to coincide with the changed target rotation position information of the front curtain in the exposure section. The same applies to the opposite case.

The first and second embodiments describe a case where the control target is the motor configured to drive the shutter unit in the image pickup apparatus, but the control target may be a motor of another optical unit, such as a mirror unit configured to drive a quick return mirror in an image pickup apparatus or a diaphragm unit configured to drive a diaphragm blade in an image pickup apparatus or in an interchangeable lens (optical apparatus). The mirror unit is not required to have the control accuracy in the rotation position of the motor in the exposure section as high as that required in the shutter unit, but when the initial position deviation is reduced, it is possible to improve the controllability of a mirror driving motor and to improve stop accuracy. Improving the stop accuracy makes it possible to reduce a transition time to next operation and to improve controllability of the next operation. A similar effect can be acquired in the diaphragm unit.

Third Embodiment

Next, a description will be given of a third embodiment of the present disclosure. A motor control apparatus of this embodiment includes the initial position deviation adjustment unit 17 described in the first and second embodiments. The configuration of the motor control apparatus for controlling the stepping motor 101 and the method of position feedback control in this embodiment are the same as those in the first and second embodiments.

Figure 14:
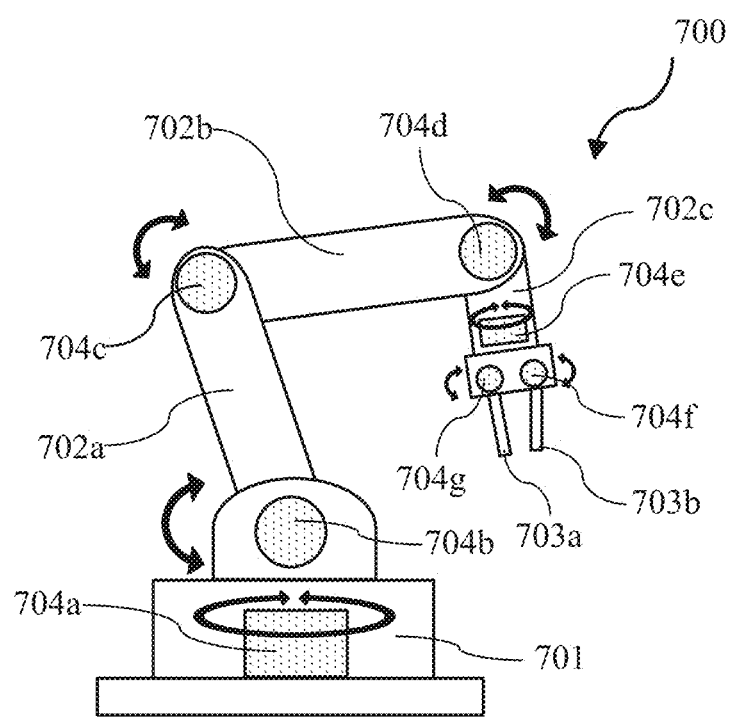
FIG. 14 is a diagram illustrating a configuration of a robot manipulator apparatus according to a third embodiment.

In this embodiment, a robot manipulator apparatus will be described as a control target. FIG. 14 illustrates a configuration example of a robot manipulator apparatus 700. The robot manipulator apparatus functions as a holding and conveying system for holding a stilled holding object and conveys the holding object to a predetermined position.

In the robot manipulator apparatus 700, a manipulator includes a base 701, an arm 702, and hands 703a and 703b. The arm 702 is rotatably and swingably connected to the base 701. The arm 702 includes a first arm 702a, a second arm 702b, and a third arm 702c each of which is swingably connected to each other. The hands 703a and 703b are connected to a tip of the third arm 702c such that the hands 703a and 703b can be opened and closed. Swings and rotations are driven by motors 704a to 704e disposed on connecting portions of the base 701 and the arm 703. The open/close driving of the hands 703a and 703b is caused by motors 704g and 704f. By rotating and swinging, the base 701 and the arm 702 moves the hands 703a and 703b to arbitrary spatial coordinates, and by opening and closing, the hands 703a and 703b hold and convey the holding object.

In this embodiment, a description will be given of the robot manipulator apparatus including the hands 703a and 703b each having a holding function, but an attachment having another function may be attached to the arm 702 instead of the hands. For example, the robot manipulator apparatus may be used as a robot manipulator apparatus for welding with a welding torch attached, or may be used as a robot manipulator apparatus for processing/cutting with an attachment having a material processing/cutting function attached. Further, the robot manipulator apparatus may be used as a robot manipulator apparatus for a dispenser with an attachment having a function of discharging a fixed quantity of liquid, etc. attached.

As the motors 704a to 704g, the stepping motor 101 may be used as in the first and second embodiments, or a DC brushless motor or the like, which is often used in industrial robot applications, may be used.

Generally, motors rotate with high speed and output low torque, and hence, a robot often includes a deceleration mechanism to use a motor with the rotation speed reduced and the torque increased. In manipulator systems operated with low output torque, motors are often used with a small reduction ratio. If the reduction ratio is small, the rotation amount of the motor and the rotation amount of the arm or hand are closer to each other, and therefore, it is necessary to consider the problem of driving the motor at a high speed and a small rotation number.

As the deceleration mechanism, a gear such as the idler gear 402 described in the first embodiment is used, and since a driving gear disposed on an output shaft of each motor engages with a gear of the deceleration mechanism, it is necessary to take account of an effect of a backlash. Further, the backlash occurs at each connecting portion, and therefore even when the effect of backlash is small at each connecting portion, an unacceptable error may be caused as a whole.

A stable repetitive motion in the robot manipulator apparatus is realized by using a position feedback control that provide a control so that an ideal trajectory is followed from a start point to a target end point of a motion. As the ideal trajectory, position trajectory information may be used which is stored in advance as internal control information. Position trajectory information may be used which is calculated each time from information on the rotation speed (acceleration operation time, deceleration operation time) of the motor set in advance, depending on distance information between an arbitrary start point and end point. Further, the distance information between the start point and the end point may be acquired from image pickup information from an external camera (not illustrated). In the robot manipulator apparatus for processing/cutting or for the dispenser, an ideal trajectory of a curved line or a circle may be set instead of a straight line, and it is required to follow the ideal trajectory of various shapes.

When the hands 703a and 703b cooperate with each other to perform the holding operation, each of them may follow the ideal trajectory. If one hand touches the holding object first, the holding object may be shifted or vibrated, which may reduce a stability of the holding operation. The stable holding operation is realized when each of the hands 703a and 703b follows the ideal trajectory.

In the position feedback control with the motor rotate with high speed and low rotation number, it is necessary to consider a magnitude of the initial position deviation at the start of driving. The initial position deviation increases when the stop accuracy in the previous driving is low, and also changes depending on a gear engagement state, i.e., an amount of gap and a direction of bias on gap each of which is caused by the backlash. As described in the first embodiment, if the initial position deviation is large, the controllability of the position feedback deteriorates, and thus it is desirable to make the initial position deviation as small as possible. Further, depending on the direction of the gap in the gear in the deceleration mechanism, a deviation amount from the target at the tip of the arm increases, the deviation amount being known as a lost motion. In order that the lost motion is reduced, the gap may be biased to one side at the start of driving.

A general-purpose small and lightweight robot manipulator apparatus is used in various places and environments, and a vibration state of the robot manipulator apparatus changes depending on the place and environment, and torque characteristics of the motor change depending on the temperature. In addition, the position accuracy may deteriorate due to thermal expansion and contraction of the robot body. Such fluctuations in characteristics may cause fluctuations in a position controllability of the motor, and make the stop accuracy not stable, leading to variations in the magnitude of the initial position deviation.

When the motor control apparatus described in the first and second embodiments is applied to the robot manipulator apparatus in which the magnitude of the initial position deviation fluctuates, it is possible to reduce the decrease in the position feedback controllability. That is, the robot manipulator apparatus of this embodiment starts the position feedback control for each motor after making the initial position deviation within the target range. As a result, good controllability can be acquired in the position feedback control on the motor, which is required to have high speed followability with a small number of rotations (or a short control time).

In this embodiment, the effect of the lost motion may be reduced by performing processing of biasing the gap on one side as described in the first embodiment. There are applications such as material processing where the change of the trajectory near the start point is not allowed, but in the holding and conveying system, it is often allowed to change the trajectory near the start point in the trajectory from the start point to the end point of the driving. Thus, it is possible to use the rewriting of the target trajectory as described in the second embodiment.

According to this embodiment, the initial position deviation is reduced, and thereby it is possible to improve the controllability of the motor used in the robot manipulator apparatus and to improve the stop accuracy. By improving the stop accuracy, it is possible to reduce the transition time to the next operation and to improve the controllability of the next operation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above embodiments, a good controllability can be acquired by reducing the initial position deviation when the position feedback control is provided on the motor.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-090341, filed on May 25, 2020, and 2020-206996, filed on Dec. 14, 2020, both of which are hereby incorporated by reference herein in their entirety.

What is claimed is:

1. A motor control apparatus comprising:
at least one processor; and
at least one memory coupled to the at least one processor storing instructions that, when executed by the at least one processor, cause the at least one processor to function as:
a detection unit configured to detect an actual rotation position of a motor;
a control unit configured to provide position feedback control on the motor so that the detected actual rotation position sequentially approaches a plurality of target rotation positions; and
a processing unit configured to perform, before the position feedback control starts, processing to make an initial position deviation fall within a predetermined range, the initial position deviation being a difference between the actual rotation position and a first target rotation position of the plurality of target rotation positions,
wherein as the processing, the processing unit performs processing of rotating the motor so that the actual rotation position approaches or coincides with the first target rotation position, and
wherein the processing unit changes at least part of the target rotation positions including the first target rotation position of the plurality of target rotation positions, based on a rotation direction of the motor during the processing.

2. The motor control apparatus according to claim 1, wherein the processing unit does not change part of the target rotation positions of a second and subsequent target rotation positions of the plurality of target rotation positions.

3. A motor control apparatus comprising:
at least one processor; and
at least one memory coupled to the at least one processor storing instructions that, when executed by the at least one processor, cause the at least one processor to function as:
a detection unit configured to detect an actual rotation position of a motor;
a control unit configured to provide position feedback control on the motor so that the detected actual rotation position sequentially approaches a plurality of target rotation positions; and
a processing unit configured to perform, before the position feedback control starts, processing to make an initial position deviation fall within a predetermined range, the initial position deviation being a difference between the actual rotation position and a first target rotation position of the plurality of target rotation positions,
wherein as the processing, the processing unit performs processing of changing the first target rotation position so that the first target position approaches or coincides with the actual rotation position.

4. The motor control apparatus according to claim 3, wherein the processing unit changes the first target rotation position of the plurality of target rotation positions and changes at least part of second and subsequent target rotation positions.

5. A motor control apparatus comprising:
at least one processor; and
at least one memory coupled to the at least one processor storing instructions that, when executed by the at least one processor, cause the at least one processor to function as:
a detection unit configured to detect an actual rotation position of a motor;
a control unit configured to provide position feedback control on the motor so that the detected actual rotation position sequentially approaches a plurality of target rotation positions; and
a processing unit configured to perform, before the position feedback control starts, processing to make an initial position deviation fall within a predetermined range, the initial position deviation being a difference between the actual rotation position and a first target rotation position of the plurality of target rotation positions, wherein the processing unit selects the processing from (a) first processing of rotating the motor so that the actual rotation position approaches or coincides with the first target rotation position, and (b) second processing of changing the first target rotation position so that the first target rotation position approaches or coincides with the actual rotation position.

6. The motor control apparatus according to claim 5, wherein when the initial position deviation is larger than a first predetermined value, the processing unit selects the first processing, and wherein when the initial position deviation is smaller than a second predetermined value, the processing unit selects the second processing.

7. The motor control apparatus according to claim 5, wherein the processing unit performs the second processing after selecting and performing the first processing.

8. The motor control apparatus according to claim 1, wherein the control unit is further configured to:
generate a waveform of a driving voltage applied to the motor;
determine an output control amount by inputting a position deviation between the actual rotation position and the target rotation position; and
control a voltage gain value for the driving waveform based on the output control amount.

9. The motor control apparatus according to claim 8, wherein the control unit is further configured to:
synchronize a phase of the detected actual rotation position with a phase of the driving waveform; and
give a predetermined phase difference between the actual rotation position and the driving waveform.

10. A robot manipulator apparatus comprising:
a motor;
a manipulator driven by the motor; and
the motor control apparatus according to claim 1.

11. A motor control method comprising:
detecting an actual rotation position of a motor;
providing position feedback control on the motor so that the detected actual rotation position sequentially approaches a plurality of target rotation positions; and
performing, before the position feedback control starts, processing to make an initial position deviation fall within a predetermined range, the initial position deviation being a difference between the actual rotation position and a first target rotation position of the plurality of target rotation positions, wherein, as the processing in the performing, processing of rotating the motor is performed so that the actual rotation position approaches or coincides with the first target rotation position, and wherein, in the performing, at least part of the target rotation positions including the first target rotation position of the plurality of target rotation positions is changed based on a rotation direction of the motor during the processing.

12. A non-transitory computer-readable storage medium storing a computer program that causes a computer to execute the control method according to claim 11.

13. The motor control apparatus according to claim 3, wherein the control unit is further configured to:
generate a waveform of a driving voltage applied to the motor;
determine an output control amount by inputting a position deviation between the actual rotation position and the target rotation position; and
control a voltage gain value for the driving waveform based on the output control amount.

14. The motor control apparatus according to claim 13, wherein the control unit is further configured to:
synchronize a phase of the detected actual rotation position with a phase of the driving waveform; and
give a predetermined phase difference between the actual rotation position and the driving waveform.

15. A robot manipulator apparatus comprising:
a motor;
a manipulator driven by the motor; and
the motor control apparatus according to claim 3.

16. The motor control apparatus according to claim 5, wherein the control unit is further configured to:
generate a waveform of a driving voltage applied to the motor;
determine an output control amount by inputting a position deviation between the actual rotation position and the target rotation position; and
control a voltage gain value for the driving waveform based on the output control amount.

17. The motor control apparatus according to claim 16, wherein the control unit is further configured to:
synchronize a phase of the detected actual rotation position with a phase of the driving waveform; and
give a predetermined phase difference between the actual rotation position and the driving waveform.

18. A robot manipulator apparatus comprising:
a motor;
a manipulator driven by the motor; and
the motor control apparatus according to claim 5.

19. A motor control method comprising:
detecting an actual rotation position of a motor;
providing position feedback control on the motor so that the detected actual rotation position sequentially approaches a plurality of target rotation positions; and
performing, before the position feedback control starts, processing to make an initial position deviation fall within a predetermined range, the initial position deviation being a difference between the actual rotation position and a first target rotation position of the plurality of target rotation positions, wherein, as the processing in the performing, processing of changing the first target rotation position is performed so that the first target position approaches or coincides with the actual rotation position.

20. A motor control method comprising:
detecting an actual rotation position of a motor;
providing position feedback control on the motor so that the detected actual rotation position sequentially approaches a plurality of target rotation positions; and
performing, before the position feedback control starts, processing to make an initial position deviation fall within a predetermined range, the initial position deviation being a difference between the actual rotation position and a first target rotation position of the plurality of target rotation positions, wherein, in the performing, the processing is selected from (a) first processing of rotating the motor so that the actual rotation position approaches or coincides with the first target rotation position, and (b) second processing of changing the first target rotation position so that the first target rotation position approaches or coincides with the actual rotation position.

21. A non-transitory computer-readable storage medium storing a computer program that causes a computer to execute the control method according to claim 19.

22. A non-transitory computer-readable storage medium storing a computer program that causes a computer to execute the control method according to claim 20.

* * * * *

UNITED STATES PATENT AND TRADEMARK OFFICE
CERTIFICATE OF CORRECTION

PATENT NO. : 11,695,354 B2
APPLICATION NO. : 17/324785
DATED : July 4, 2023
INVENTOR(S) : Jun Yamamoto It is certified that error appears in the above-identified patent and that said Letters Patent is hereby corrected as shown below:

On the Title Page

Item (73), the Assignee name "Canon Kabashiki Kaisha" should be changed to --Canon Kabushiki Kaisha--.

Signed and Sealed this
Fifteenth Day of August, 2023

Katherine Kelly Vidal
*Director of the United States Patent and Trademark Office*